US011888976B2

(12) United States Patent
Covaci et al.

(10) Patent No.: US 11,888,976 B2
(45) Date of Patent: Jan. 30, 2024

(54) SYSTEM AND METHOD FOR MULTI-PARTY GENERATION OF BLOCKCHAIN-BASED SMART CONTRACT

(71) Applicant: nChain Licensing AG, Zug (CH)

(72) Inventors: Alexandra Covaci, London (GB); Simone Madeo, London (GB); Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/678,926

(22) Filed: Feb. 23, 2022

(65) Prior Publication Data
US 2022/0271919 A1 Aug. 25, 2022

Related U.S. Application Data

(63) Continuation of application No. 16/772,136, filed as application No. PCT/IB2018/059918 on Dec. 12, 2018, now Pat. No. 11,271,729.

(30) Foreign Application Priority Data

Dec. 13, 2017 (GB) ..................... 1720768
Aug. 23, 2018 (GB) ..................... 1813770
Aug. 23, 2018 (GB) ..................... 1813772

(51) Int. Cl.
G06F 17/17 (2006.01)
H04L 9/32 (2006.01)
(Continued)

(52) U.S. Cl.
CPC ............. H04L 9/085 (2013.01); G06F 7/725 (2013.01); G06F 17/17 (2013.01); H04L 9/14 (2013.01);
(Continued)

(58) Field of Classification Search
CPC ......... H04L 9/085; H04L 9/14; H04L 9/3066; H04L 9/3093; H04L 9/3218; H04L 9/50;
(Continued)

(56) References Cited

U.S. PATENT DOCUMENTS 4,667,290 A 5/1987 Goss et al.
5,297,150 A 3/1994 Clark
(Continued)

FOREIGN PATENT DOCUMENTS

CN 104580240 A 4/2015
CN 106506146 A 3/2017
(Continued)

OTHER PUBLICATIONS

"Bryan Parno, Jon Howell, Craig Gentry, Mariana Raykova", "Pinocchio: Nearly Practical Verifiable Computation", vol. 59 (Year: 2016).*
(Continued)

Primary Examiner — Darshan I Dhruv
(74) Attorney, Agent, or Firm — Davis Wright Tremaine LLP

(57) ABSTRACT

Systems and methods described herein relate to techniques that allow for multiple parties to jointly generate or jointly agree upon the parameters for generation of a smart contract, such as a verification key. Execution of the smart contract may be performed by a third party, for example, a worker node on a blockchain network. Techniques described herein may be utilised as part of a protocol in which parties of a smart contract share powers of a secret in a manner that allows each party to determine an identical common reference string, agree on parameters for a smart contract, agree and/or make proportionate contributions the smart contract, and combinations thereof. The smart contract may be pub-
(Continued)

lished to a blockchain network (e.g., Bitcoin Cash). The protocol may be a zero-knowledge protocol.

14 Claims, 7 Drawing Sheets

(51) Int. Cl.
*H04L 9/14* (2006.01)
*H04L 9/30* (2006.01)
*H04L 9/08* (2006.01)
*G06F 7/72* (2006.01)
*H04L 9/00* (2022.01)

(52) U.S. Cl.
CPC .......... *H04L 9/3066* (2013.01); *H04L 9/3093* (2013.01); *H04L 9/3218* (2013.01); *H04L 9/0841* (2013.01); *H04L 9/3236* (2013.01); *H04L 9/50* (2022.05)

(58) Field of Classification Search
CPC ..... H04L 9/0841; H04L 9/3236; G06F 7/725; G06F 17/17
See application file for complete search history.

(56) References Cited

U.S. PATENT DOCUMENTS

| | | | |
|---|---|---|---|
| 5,404,531 A | 4/1995 | Wakatani | |
| 5,499,191 A | 3/1996 | Young | |
| 5,920,830 A | 7/1999 | Hatfield et al. | |
| 6,064,928 A | 5/2000 | Wilson et al. | |
| 6,161,180 A | 12/2000 | Matyas et al. | |
| 6,519,754 B1 | 2/2003 | McElvain et al. | |
| 7,085,701 B2 | 8/2006 | Rich et al. | |
| 7,209,555 B2 | 4/2007 | Futa et al. | |
| 7,281,017 B2 | 10/2007 | Hostetter et al. | |
| 7,590,236 B1 | 9/2009 | Boneh et al. | |
| 8,165,287 B2 | 4/2012 | Ghouti et al. | |
| 8,331,556 B2 | 12/2012 | Billet et al. | |
| 8,607,129 B2 | 12/2013 | Radhakrishnan et al. | |
| 8,824,670 B2 | 9/2014 | Icart et al. | |
| 8,904,181 B1 | 12/2014 | Felsher et al. | |
| 9,026,978 B1 | 5/2015 | Liu et al. | |
| 9,286,602 B2 | 3/2016 | Rosati et al. | |
| 9,483,596 B1 | 11/2016 | Badar et al. | |
| 9,569,771 B2 | 2/2017 | Lesavich et al. | |
| 10,135,607 B1 | 11/2018 | Roets | |
| 10,419,209 B1* | 9/2019 | Griffin | H04L 9/3263 |
| 2003/0125917 A1 | 7/2003 | Rich et al. | |
| 2004/0015739 A1 | 1/2004 | Heinkel et al. | |
| 2005/0004899 A1 | 1/2005 | Baldwin et al. | |
| 2006/0149962 A1 | 7/2006 | Fountain et al. | |
| 2007/0061487 A1 | 3/2007 | Moore et al. | |
| 2007/0157132 A1 | 7/2007 | Cheng et al. | |
| 2008/0127067 A1 | 5/2008 | Aubertine et al. | |
| 2010/0067686 A1 | 3/2010 | Minematsu | |
| 2010/0131933 A1 | 5/2010 | Kim et al. | |
| 2010/0272209 A1 | 10/2010 | Lee et al. | |
| 2011/0200188 A1 | 8/2011 | Ghouti et al. | |
| 2012/0284175 A1 | 11/2012 | Wilson et al. | |
| 2013/0031446 A1 | 1/2013 | Kamiya | |
| 2013/0097420 A1 | 4/2013 | Zaverucha | |
| 2014/0250296 A1 | 9/2014 | Hansen | |
| 2014/0321644 A1 | 10/2014 | Lemieux | |
| 2014/0337234 A1 | 11/2014 | Tang et al. | |
| 2015/0379510 A1 | 12/2015 | Smith | |
| 2016/0004820 A1 | 1/2016 | Moore | |
| 2016/0087802 A1 | 3/2016 | Peeters | |
| 2016/0140340 A1 | 5/2016 | Walters et al. | |
| 2016/0162897 A1 | 6/2016 | Feeney | |
| 2016/0283941 A1 | 9/2016 | Andrade | |
| 2016/0357948 A1 | 12/2016 | Takeuchi | |
| 2017/0039330 A1 | 2/2017 | Tanner, Jr. et al. | |
| 2017/0091750 A1 | 3/2017 | Maim | |
| 2017/0131983 A1 | 5/2017 | Roytman et al. | |
| 2017/0132421 A1 | 5/2017 | Unitt | |
| 2017/0132619 A1 | 5/2017 | Miller et al. | |
| 2017/0140408 A1 | 5/2017 | Wuehler | |
| 2017/0142103 A1 | 5/2017 | Bringer et al. | |
| 2017/0155515 A1* | 6/2017 | Androulaki | H04L 63/0823 |
| 2017/0177312 A1 | 6/2017 | Boehm et al. | |
| 2017/0178263 A1 | 6/2017 | Kraemer et al. | |
| 2017/0180341 A1 | 6/2017 | Walker et al. | |
| 2017/0220815 A1 | 8/2017 | Ansari et al. | |
| 2017/0221052 A1* | 8/2017 | Sheng | H04L 9/14 |
| 2017/0249716 A1 | 8/2017 | Meixner et al. | |
| 2017/0250815 A1 | 8/2017 | Cuende et al. | |
| 2017/0277909 A1 | 9/2017 | Kraemer et al. | |
| 2017/0278100 A1 | 9/2017 | Kraemer et al. | |
| 2017/0279611 A1 | 9/2017 | Kraemer et al. | |
| 2017/0286079 A1 | 10/2017 | Cho et al. | |
| 2017/0286717 A1 | 10/2017 | Khi et al. | |
| 2017/0287090 A1 | 10/2017 | Hunn et al. | |
| 2017/0317833 A1* | 11/2017 | Smith | G06Q 20/3829 |
| 2017/0317834 A1 | 11/2017 | Smith et al. | |
| 2017/0337319 A1 | 11/2017 | Camus et al. | |
| 2017/0344988 A1* | 11/2017 | Cusden | H04L 63/12 |
| 2017/0352209 A1 | 12/2017 | Keuffer et al. | |
| 2017/0353309 A1 | 12/2017 | Gray | |
| 2018/0034634 A1 | 2/2018 | Benarroch Guenun et al. | |
| 2018/0039667 A1 | 2/2018 | Pierce et al. | |
| 2018/0049043 A1 | 2/2018 | Hoffberg | |
| 2018/0089758 A1* | 3/2018 | Stradling | G06Q 40/04 |
| 2018/0117446 A1 | 5/2018 | Tran et al. | |
| 2018/0167201 A1 | 6/2018 | Naqvi | |
| 2018/0204005 A1 | 7/2018 | Gajek et al. | |
| 2018/0270065 A1 | 9/2018 | Brown et al. | |
| 2019/0095631 A1 | 3/2019 | Roets et al. | |
| 2019/0138753 A1 | 5/2019 | Wallrabenstein | |
| 2019/0163887 A1* | 5/2019 | Frederick | H04L 9/3236 |
| 2019/0180276 A1* | 6/2019 | Lee | H04L 9/3247 |
| 2019/0295182 A1 | 9/2019 | Kfir et al. | |
| 2020/0050780 A1 | 2/2020 | Uhr et al. | |
| 2020/0184557 A1* | 6/2020 | Wang | G06F 21/6245 |
| 2020/0327498 A1* | 10/2020 | Weber | G06Q 20/0655 |
| 2021/0073795 A1 | 3/2021 | Ruiz et al. | |

FOREIGN PATENT DOCUMENTS

| | | |
|---|---|---|
| CN | 106534317 A | 3/2017 |
| CN | 107040545 A | 8/2017 |
| CN | 107179932 A | 9/2017 |
| CN | 107274184 A | 10/2017 |
| CN | 107426234 A | 12/2017 |
| EP | 3249599 A1 | 11/2017 |
| JP | 2006505055 A | 2/2006 |
| JP | 2009541853 A | 11/2009 |
| JP | 2011119952 A | 6/2011 |
| JP | 5697153 B2 | 4/2015 |
| KR | 101795696 B1 | 11/2017 |
| WO | 2016131577 A1 | 8/2016 |
| WO | 2016155804 A1 | 10/2016 |
| WO | 2016206567 A1 | 12/2016 |
| WO | 2017008829 A1 | 1/2017 |
| WO | 2017032541 A1 | 3/2017 |
| WO | 2017079652 A1 | 5/2017 |
| WO | 2017104149 A1 | 6/2017 |
| WO | 2017145010 A1 | 8/2017 |
| WO | 2017148527 A1 | 9/2017 |
| WO | 2017178956 A1 | 10/2017 |
| WO | 2017190795 A1 | 11/2017 |
| WO | 2018127446 A1 | 7/2018 |
| WO | 2018127456 A2 | 7/2018 |

OTHER PUBLICATIONS

"Parno, Jon Howell,Craig Gentry, Mariana Raykova", "Pinocchi:Nearly Practical Verifiable Computation", vol. 59, No. 2, pp. 103-112 (Year: 2016).*

Antonopoulos, "Mastering Bitcoin—Unlocking Digital Cryptocurrencies," O'Reilly Media, Inc., Dec. 20, 2014, 282 pages.

(56) References Cited

OTHER PUBLICATIONS

Ben-Sasson et al. "Scalable Zero Knowledge via Cycles of Elliptic Curves" [online] IACR, Sep. 18, 2016 [retrieved Feb. 10, 2022]. Retrieved from https://eprint.iacr.org/2014/595.pdf, 2016, 49 pages.
Ben-Sasson et al., "SNARKs for C: Verifying program executions succinctly and in zero knowledge," Advances in Cryptology—CRYPTO 2013, Aug. 18, 2013, 19 pages.
Ben-Sasson et al., "Succinct Non-Interactive Zero Knowledge for a von Neumann Architecture," USENIX Security 2014, first disclosed Dec. 30, 2013, last revised May 19, 2015, https://eprint.iacr.org/2013/879.pdf, 37 pages.
Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.
Bitcoinstrings, "Blockchain in Words," retrieved from https://bitcoinstrings.com/blk00281.txt, Dec. 2013, 667 pages.
Bowe, "Pay-to-Sudoku," GitHub, retrieved from https://github.com/zcash-hackworks/pay-to-sudoku/blob/master/README.md, 2016, 2 pages.
Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.
Buterin, "Quadratic Arithmetric Programs: from Zero to Hero," retrieved from https://medium.com/@VitalikButerin/quadratic-arithmetic-programs-from-zero-to-hero-f6d558cea649, Dec. 11, 2016, 9 pages.
Campanelli et al., "Zero-knowledge contingent payments revisited: Attacks and payments for services," Proceedings of the 2017 ACM SIGSAC Conference on Computer and Communications Security, Oct. 30, 2017, 28 pages.
Canetti et al., "Practical Delegation of Computation Using Multiple Servers," CCS, Oct. 17, 2011, 10 pages.
Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.
Commercial Search Report dated Feb. 28, 2018, United Kingdom Patent Application No. 1719998.5, filed Nov. 30, 2017, 6 pages.
Costello et al., "Geppetto: versatile Verifiable Computation," 2015 IEEE Symposium on Security and Privacy, 2015, 22 pages.
Covaci et al., "NECTAR: Non-Interactive Smart Contract Protocol using Blockchain Technology," arXiv preprint arXiv:1803.04860, Mar. 13, 2018, 8 pages.
Davidsen et al., "Empowering the Economy of Things," 2017, 54 pages.
Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSlrywb5J_0, Nov. 26, 2017, 12 pages.
Fee et al., "Cryptography using Chebyshev polynomials," Maple Summer Workshop, Burnaby, Canada, Jul. 11, 2004, http://www.cecm.sfu.ca/CAG/ppaers/CHEB, 16 pages.
Fiore et al., Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC__An_ANSI_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Gennaro et al., "Quadratic Span Programs and Succint NIZKs without PCPs," Annual International Conference on the Theory and Applications of Cryptographic Techniques, May 26, 2013, 20 pages.
Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hajjeh et al., "TLS Sign," TLS Working Group, Internet Draft Version 4, Dec. 15, 2007 [retrieved May 2, 2018], https://tools.ietf.org/html/draft-hajjeh-tls-sign-04, 12 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.
International Search Report and Written Opinion dated Jan. 15, 2019, Patent Application No. PCT/IB2018/058434, 11 pages.
International Search Report and Written Opinion dated Jan. 17, 2019, Patent Application No. PCT/IB2018/058432, 11 pages.
International Search Report and Written Opinion dated Jan. 17, 2019, Patent Application No. PCT/IB2018/058437, 10 pages.
International Search Report and Written Opinion dated Jan. 22, 2019, Patent Application No. PCT/IB2018/058583, 10 pages.
International Search Report and Written Opinion dated Jan. 23, 2019, Patent Application No. PCT/IB2018/058433, 12 pages.
International Search Report and Written Opinion dated Jan. 23, 2019, Patent Application No. PCT/IB2018/058491, 12 pages.
International Search Report and Written Opinion dated Mar. 14, 2019, Patent Application No. PCT/IB2018/059770, 12 pages.
International Search Report and Written Opinion dated Mar. 19, 2019, Patent Application No. PCT/IB2018/059918, 14 pages.
Jehan, "Rockchain Decentralized Audited Data Networks," White Paper, retrieved from https://www.rockchain.org/RockchainWhitePaper.pdf, Jan. 20, 2018, 28 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Keutzer et al., "Anatomy of a Hardware Compiler," 1988, 10 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kumaresan et al., "How to Use Bitcoin to Incentivize Correct Computations," retrieved from https://people.csail.mit.edu/ranjit/papers/incentives.pdf, Nov. 2014, 12 pages.
Kuzminov et al., "Bridging the Gaps with Iolite Blockchain," Iolite Foundation White Paper, 2017, 13 pages.
Malkhi et al., "Fairplay—A Secure Two-Party Computation System," Aug. 2004, 17 pages.
Mathworks, "MATLAB Coder—Generate C and C++ Code From MATLAB Code," 9 pages.
Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.
Paganini, Pierluigi What is a Digital Signature? Fundamental Principles, Security Affairs, May 2012, https://securityaffairs.com/5223/digital-id/what-is-a-digital-signature-fundamental-principles.html, 7 pages.

(56) References Cited

OTHER PUBLICATIONS

Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.

Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.

Mayer, "zk-SNARK Explained: Basic Principles," Dec. 13, 2016, 9 pages.

Mayer, "zk-SNARK explained: Basic Principles," retrieved from https://www.researchgate.net/publication/321124635_zk-SNARK_explained_Basic_Principles, Dec. 2016, 9 pages.

Müller, "A Short Note on Secret Sharing Using Elliptic Curves," Proceedings of SECRYPT 2008, Jul. 26, 2008, http://www.scitepress.org/Papers/2008/19183/19183.pdf, 4 pages.

Nakamoto, "Bitcoin: A Peer-to-Peer Electronic Cash System," Bitcoin, Oct. 31, 2008, https://bitcoin.org/bitcoin.pdf, 9 pages.

Ning, "Automatically Convert MATLAB Code to C Code," https://www.mathworks.com/videos/automatically-converting-matlab-code-to-c-code-96483.html, Aug. 19, 2014, 8 pages.

Parno et al., "Pinocchio: Nearly Practical Verifiable Computation," IEEE Symposium on Security and Privacy, May 19-22, 2013, 16 pages.

Parno, "A Note on the Unsoundness of vnTinyRAM's SNARK," retrieved from https://eprint.iacr.org/2015/437, May 6, 2015, 4 pages.

Prasad et al., "Effect pf Quine-McCluskey Simplification on Boolean Space Complexity," IEEE Xplore, Jul. 25-26, 2009, 6 pages.

Ritzdorf et al., "TLS-N: Non-repudiation over TLS Enabling Ubiquitous Content Signing for Disintermediation," IACR ePrint report, first disclosed 2017 [retrieved May 2, 2018], 16 pages.

Satoshi et al., "Connection Limits," Bitcoin Forum, Aug. 9, 2010, https://bitcointalk.org/index.php?topic=741.0; prev_next=prev, 2 pages.

Schaeffer et al., "ZoKrates—a Toolbox for zkSNARKS on Ethereum," https://github.com/Zokrates/ZoKrates, Feb. 4, 2019, 3 pages.

Schoenmakers et al., "Trinocchio: Privacy-Preserving Outsourcing by Distributed Verifiable Computation," International Conference on Applied Cryptography and Network Security, Jun. 19, 2016, https://eprint.iacr.org/2015/480.pdf, 33 pages.

Stuart, "EECS Presents Awards for Outstanding PhD and SM Theses," EECS, Nov. 8, 2017, 2 pages.

Sward et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty 2017, 19 pages.

Teutsch et al., "A scalable verification solution for blockchains," Nov. 16, 2017, https://people.cs.uchicago.edu/~teutsch/papers/truebit.pdf, 50 pages.

Tillich et al., "Circuits of basic functions suitable for MPC and FHE," https://homes.esat.kuleuven.be/~nsmart/MPC/, first disclosed 2012, retrieved May 2, 2018, 2 pages.

Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.

Turner, "CSE 260. Introduction to Digital Logic and Computer Design," Syllabus and Text Book, https://www.arl.wustl.edu/-jst/cse/260/ddc.pdf, 2015, 435 pages.

Turner, "Designing Digital Circuits a modern approach," CSE 260, Introduction to Digital Logic and Computer Design, Spring 2014, 435 pages.

UK Commercial Search Report dated Dec. 3, 2018, Patent Application No. GB1806444.4, 8 pages.

UK Commercial Search Report dated Feb. 2, 2018, Patent Application No. GB1718505.9, 7 pages.

UK Commercial Search Report dated May 31, 2018, Patent Application No. GB1801753.3, 8 pages.

UK Commercial Search Report dated Oct. 25, 2018, Patent Application No. GB1805948.5 , 9 pages.

UK IPO Search Report dated Jul. 26, 2018, Patent Application No. GB1801753.3, 5 pages.

UK IPO Search Report dated Nov. 2, 2018, Patent Application No. GB1805948.5, 4 pages.

UK IPO Search Report dated Nov. 8, 2018, Patent Application No. GB1806444.4, 6 pages.

United Kingdom Commercial Search Report dated Apr. 20, 2018, Patent Application No. 1720768.9, filed Dec. 13, 2017, 8 pages.

United Kingdom Intellectual Property Office Search Report dated Jun. 12, 2018, Patent Application No. 1720768.9, filed Dec. 13, 2017, 7 pages.

United Kingdom Intellectual Property Office Search Report dated May 3, 2018, Patent Application No. 1719998.5, filed Nov. 30, 2017, 6 pages.

United Kingdom IPO Search Report dated Apr. 27, 2018, Patent Application No. 1718505.9, filed Nov. 9, 2017, 5 pages.

Viacoin Dev Team, "Styx: Unlinkable Anonymous Atomic Payment Hub For Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.

Virza, "On Deploying Succinct Zero-Knowledge Proofs" [online] MIT, Sep. 2017 [retrieved Feb. 10, 2022]. Retrieved from the Internet: URL: On Deploying Succinct Zero-Knowledge Proofs, 2016, 131 pages.

Wikipedia, "Precompiled Header," Retrieved Mar. 30, 2022, https://en.wikipedia.org/w/index.php?title=Precompiled_header&oldid=807155683, 3 pages.

Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.

Wu et al., "Libsnark: a C++ Library for zkSNARK Proofs," SCIPR Lab, libsnark/README.md at 92a80f74727091fdc40e6021dc42e9f6b67d5176, Aug. 18, 2017, 9 pages.

ZCash, "zk-SNARKs," zCash website, retrieved Apr. 1, 2022 from https://web.archive.org/web/20171107012237/https://z.cash/technology/zksnarks.html, Nov. 24, 2017, 1 page.

Wikipedia, "Huffman coding," Wikipedia the Free Encyclopedia, Feb. 24, 2018, https://en.wikipedia.org/w/index.php?title=Huffman_coding&oldid=827366029, 11 pages.

Bitcoin Core, "The First Successful Zero-Knowlwdge Contingent Payment", 2022, 5 pages.

Zyskind et al., "Enigma: Decentralized Computation Platform with Guaranteed Privacy," arXiv preprint arXiv:1506, Jun. 10, 2015, 14 pages.

Chen et al., "Algebraic Geometric Secret Sharing Schemes and Secure Multi-Party Computations over Small Fields", Advances in Cryptology, 2006, 16 pages.

Parno et al., "Pinocchio: Nearly Practical Verifiable Computation," IEEE Symposium on Security and Privacy, May 19, 2013, 16 pages.

"How Log Proofs Work," Certificate Transparency, Sep. 25, 2017 [retrieved May 2, 2018], https://web.archive.org/web/20170925180136/http://www.certificate-transparency.org/log-proofs-work, 5 pages.

Anonymous, "Background Page," Oraclize, Oct. 2017 [retrieved May 2, 2018], https://web.archive.org/web/20171017121053/http://docs.oraclize.it/, 18 pages.

Bertani et al., "How can I trust smart contracts that use Oraclize?," Reddit, May 25, 2017 [retrieved May 2, 2018], https://www.reddit.com/r/ethereum/comments/6d7j7x/how_can_i_trust_smart_contracts_that_use_oraclize/di0nb17/, 5 pages.

Fu, "Off-Chain Computation Solutions for Ethereum Developers," Medium, Sep. 12, 2017 [retrieved May 2, 2018], https://medium.com/@YondonFu/off-chain-computation-solutions-for-ethereum-developers-507b23355b17, 8 pages.

International Search Report and Written Opinion dated Mar. 14, 2019, Patent Application No. PCT/IB2018/059920, 12 pages.

Spencertruman et al., "[Whitepaper] Witnet: A Decentralized Oracle Network Protocol," Bitcoin Forum, Dec. 11, 2017 [retrieved May 2, 2018], https://bitcointalk.org/index.php?topic=2567253.0, 9 pages.

Tarr, "Merkle Tree Logs #27," https://github.com/ssbc/secure-scuttlebutt/issues/27, Sep. 17, 2014, 4 pages.

(56) References Cited

OTHER PUBLICATIONS

Tarr, "Tree-Exchange," Github, Aug. 4, 2014 (last updated Sep. 17, 2014) [retrieved May 10, 2018], https://github.com/dominictarr/tree-exchange, 3 pages.
UK Commercial Search Report dated May 4, 2018, Patent Application No. GB1720946.1, 8 pages.
UK IPO Search Report dated Jun. 15, 2018, Patent Application No. GB1720946.1, 4 pages.
Van Den Hooff et al., "VerSum: Verifiable Computations over Large Public Logs," Proceedings of the 2014 ACM SIGSAC Conference on Computer and Communications Security, Nov. 3, 2014, 14 pages.
Zhang et al., "A Remote-Attestation-Based Extended Hash Algorithm for Privacy Protection," 2017 International Conference on Computer Network, Electronic and Automation (ICCNEA), Sep. 23, 2017, 4 pages.
Klmoney, "Part 1: Transaction Basics", Jun. 6, 2017, retrieved from the internet, https://web.archive.org/web/20170606202729/https://klmoney.wordpress.com/bitcoin-dissecting-transactions-part-1, 9 pages.
Vangie, Beal, "What is a Computer System?" Webopedia, Aug. 1, 2022, https://www.webopedia.com/definitions/computer-system, 2 pages.
Bertani, "Scalable Onchain Verification for Authenticated Data Feeds and Offchain Computations," YouTube, Ethereum Foundation, Nov. 26, 2017 [retrieved May 10, 2018], https://www.youtube.com/watch?v=7uQdEBVu8Sk, 19:19, 4 pages.
Tarr et al., "Merkle Tree Logs #27," GitHub Secure-Scuttlebutt project page, Sep. 17, 2014 [retrieved May 10, 2018], https://github.com/ssbc/secure-scuttlebutt/issues/27, 4 pages.

\* cited by examiner

SYSTEM AND METHOD FOR MULTI-PARTY GENERATION OF BLOCKCHAIN-BASED SMART CONTRACT

CROSS REFERENCE TO RELATED APPLICATIONS

This application is a continuation of U.S. patent application Ser. No. 16/772,136, filed Jun. 11, 2020, entitled "SYSTEM AND METHOD FOR MULTI-PARTY GENERATION OF BLOCKCHAIN-BASED SMART CONTRACT," which is a 371 Nationalization Patent Application of International Patent Application No. PCT/IB2018/059918, filed Dec. 12, 2018, entitled "SYSTEM AND METHOD FOR MULTI-PARTY GENERATION OF BLOCKCHAIN-BASED SMART CONTRACT," which claims priority to United Kingdom Patent Application No. 1720768.9, filed Dec. 13, 2017, entitled "COMPUTER-IMPLEMENTED SYSTEM AND METHOD," United Kingdom Patent Application No. 1813772.9, filed Aug. 23, 2018, entitled "COMPUTER-IMPLEMENTED SYSTEM AND METHOD," and United Kingdom Patent Application No. 1813770.3, filed Aug. 23, 2018, entitled "COMPUTER-IMPLEMENTED SYSTEM AND METHOD, the disclosures of which are incorporated herein by reference in their entirety.

FIELD OF INVENTION

This invention relates generally to the execution of smart contract between multiple (e.g., more than two) parties, and more particularly to implementations in which a verification key for a smart contract is collectively generated by two or more parties of a smart contract and a third party (e.g., a worker node on a blockchain network) is utilised to execute the smart contract in a computationally verifiable manner. The third computing entity may generate a proof of correct execution of the smart contract, which can be used to unlock digital assets encumbered by the first computing entity and the second computing entity. The invention is particularly suited, but not limited to, use in a blockchain network such as a Bitcoin-based blockchain network.

BACKGROUND OF INVENTION

A blockchain may refer to a peer-to-peer, electronic ledger which is implemented as a computer-based decentralised, distributed system made up of blocks which in turn may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoins. In some implementations, transferring control of a digital asset can be performed by reassociating at least a portion of a digital asset from a first entity to a second entity. Each block of the blockchain may contain a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, etc.) while being more versatile in their applications.

The present disclosure describes technical aspects of one or more blockchain-based computer programs. A blockchain-based computer program may be a machine readable and executable program recorded in a blockchain transaction. The blockchain-based computer program may comprise rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

SUMMARY OF INVENTION

Thus, it is desirable to provide a protocol for multi-party verification key recording on a blockchain by exchanging quantities that can be used to determine powers of a shared secret between two or more parties. In various embodiments, it may be desirable for two or more parties of a smart contract to exchange quantities that are usable to determine a common reference string that comprises a verification key and an evaluation key. In various embodiments, the techniques described herein allow two or more parties to exchange powers of a shared secret without the use of cryptographic techniques such as encryption, and furthermore does not require the parties to establish a communications channel that requires cryptographically verifiable assurances confidentiality of data exchanged over said communications channel.

Such an improved solution has now been devised.

Thus, in accordance with the present invention there are provided systems and methods as defined in the appended claims.

In accordance with the invention there may be provided a computer-implemented method for a node of a blockchain network, the computer-implemented method comprising, at a first computing entity: determining, based at least in part on a first polynomial and at least two elliptic curve points, a set of elliptic curve points for a second computing entity; making a subset of the set of elliptic curve points available to the second computing entity; receiving a second set of elliptic curve points generated using a second polynomial; determining a power of a secret based at least in part on the first set and the second set; determining, based at least in part on the power of the secret, a common reference string comprising a verification key and an evaluation key, wherein the common reference string is also determinable by the second computing entity as a result of the first computing entity providing the subset to the second computing entity; and generating a smart contract comprising a first transaction input provided by the first computing entity and a second transaction input provided by the second computing entity, wherein correct execution of the smart contract by a third computing entity results in the third computing entity being able to generate a blockchain transaction using an output of the smart contract.

The set of elliptic curve points as described above may comprise corresponding elliptic curve points for powers of the first polynomial (e.g., an elliptic curve point for each polynomial power).

Preferably, the first polynomial may be of at least order 2.

Preferably, the subset described above is the set of elliptic curve points. Furthermore, unless otherwise noted or contradicted by context, the term "subset" of a corresponding set does not necessarily denote a proper subset of the corresponding set, but the subset and the corresponding set may be equal.

The secret may be shared between the first computing entity and the second computing entity without using a cryptographically protected communications channel.

The first computing entity and the second computing entity may collectively determine both the first digital asset and the second digital asset.

Preferably, some or all of the methods described herein may further comprise: determining, based on a third polynomial and the at least two elliptic curve points, a third set of elliptic curve points for the second computing entity; making a second subset of the third set of elliptic curve points available to the second computing entity; receiving a fourth set of elliptic curve points; determining a parameter based at least in part on the third set and the fourth set, the parameter also determinable by the second computing entity as a result of the first computing entity providing the second subset to the second computing entity; and wherein the determining of the common reference string is based further at least in part on the parameter.

Preferably, some or all of the methods described herein may further comprise sharing an elliptic curve parameter between the first computing entity and the second computing entity using Shamir's Secret Sharing Scheme.

Preferably, some or all of the methods described herein may further comprise exchanging a scalar parameter between the first computing entity and the second computing entity using a Diffie-Hellman scheme (e.g., using a Diffie-Hellman key exchange algorithm).

The smart contract may comprise a Pay-To-Script-Hash (P2SH) type unlocking script that allows the third computing entity to unlock both the first digital asset and the second digital asset in response to providing a valid proof of correct execution.

The first computing entity may make the subset of the set of elliptic curve points available to the second computing entity via an off-chain communications channel.

The second polynomial may be inaccessible to the first computing entity.

Preferably, the at least two elliptic curve points are two different elliptic curve points.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompanying drawings, in which.

DETAILED DESCRIPTION

Figure 1:
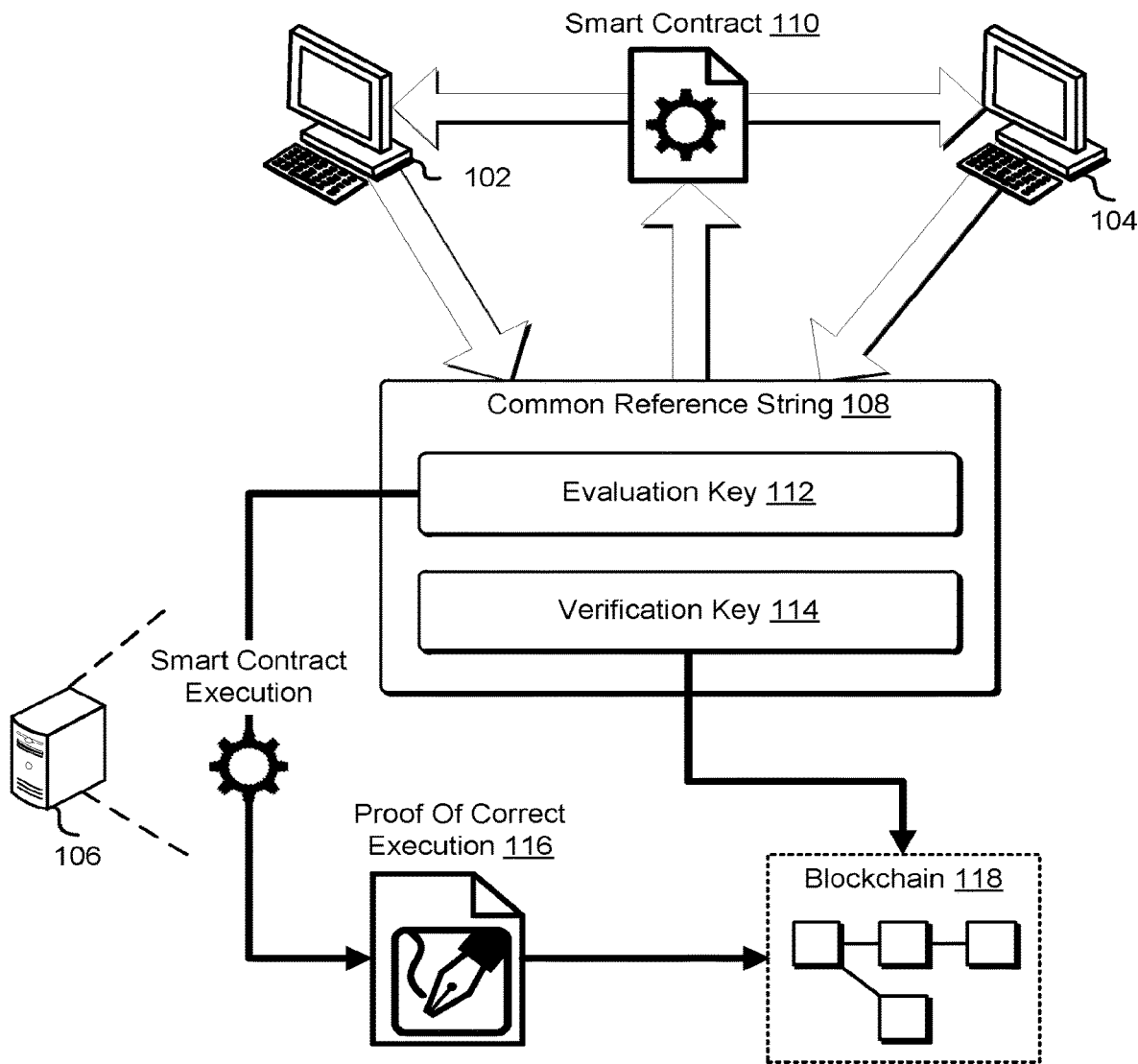
FIG. 1 illustrates a computing environment in which multiple parties of a smart contract enter into an agreement with a third party to execute the smart contract.

FIG. 1 illustrates a blockchain environment in which various embodiments can be implemented.

This disclosure describes techniques that may be utilised to implement systems and methods that allow multiple parties to securely share elements of a group, whose exponent or multiplicative coefficient depends on powers of a shared secret. Quantities may be shared such that the multiple parties exchange quantities that are based on the shared secret (e.g., powers of the shared secret) without exposing the shared secret. Accordingly, in various embodiments, a plurality of n participants establishes a representation of powers (e.g., $\langle s^i \rangle_G$ in the multiplicative case) of a shared secret.

In an embodiment, a protocol utilising techniques and methods described herein are used by two parties of a smart contract to share quantities that can be used by the parties to determine powers of a shared secret without sharing the secret itself and without revealing information that would allow another computing entity (e.g., a computing entity that is not a party to the smart contract) to determine the secret. In one embodiment, the protocol comprises a first party of a smart contract computing a first set of parameters that are transmitted to a second party of the smart contract, the second party computing a second set of parameters and submitting those parameters to the first party, wherein, upon the exchange of the parameters as described above, both parties are able to calculate the identical common reference string, which comprises a verification key. The parties may then agree on a transaction in which they make proportionate contributions of digital assets to the smart contract which are locked to an address (e.g., address of a worker node of a blockchain network) and can be unlocked (e.g., spent). In an embodiment, off-chain communications between the parties of the smart contract are limited to the exchange of the parameters used to generate the common reference string, while ensuring security is maintained (e.g., the secret value is not divulged or otherwise determinable, based on the parameters exchanged, by an adversary or other computing entity that is not a party to the smart contract). In an embodiment, the two parties (or, in the more general case, two or more parties) utilise techniques that share powers of a shared secret, such as in the manner described elsewhere in this document, for example, in connection with FIGS. 1-7.

References may be made to FIG. 1, which illustrates an example computing environment 100 in which various embodiments of the present disclosure may be practiced. Systems and methods described herein may relate to a protocol for parties of a smart contract to exchange quantities that the first and second computing entities can use to calculate the identical common reference string. FIG. 1 illustrates a computing environment 100 comprising a first computing entity 102 and a second computing entity 104 that exchange a set of parameters that, allow both the first computing entity and the second computing entity to determine a common reference string 108. The common reference string may be utilised by the parties to generate a smart contract 110 that locks digital assets which either or both of the computing entities contributes as transaction inputs. The common reference string may comprise an evaluation key 112 and a verification key 112. The smart contract 110 may be published to a blockchain, such as the blockchain 118 illustrated in FIG. 1. The smart contract 110 may be executed by a third computing entity 106 that is not a party to the smart contract 106. As part of or in association with executing the smart contract, the third computing entity (e.g., worker) may generate a proof of correct execution 116 of the smart contract based at least in part on the evaluation key of the common reference string. The proof of correct execution 116 may be computationally verifiable by any suitable computing system (e.g., parties of the smart contract or a node of the blockchain network that acts as a verifier node). In an embodiment, the verification key 114 is utilised by a fourth computing entity (e.g., verifier computer system) to verify the proof that is published to the blockchain network 118 is correct.

The first computing entity 102 and the second computing entity 104 are computer systems that are parties to a smart contract, according to at least one embodiment. Parties of a smart contract may refer to two or more computing entities that agree (e.g., pursuant to user input provided through associated user input devices) on the terms to the execution of a smart contract. The first computing entity 102 and the second computing entity 104 may both agree upon a smart contract and contribute transaction inputs to the smart contract such that the respective transaction inputs of the smart contract are encumbered by a locking script that can be unlocked (e.g., spent) as a result of a worker node providing a proof of correct execution of the smart contract. Systems and methods described herein relate to enabling a locking script to secure the verification key $V_K$ from alteration and checking validity of a proof π, thereby allowing execution of a zero-knowledge protocol on a blockchain during transaction validation.

In various embodiments, the first computing entity 102 and the second computing entity 104 may agree upon a smart contract, in an embodiment, by exchanging a set of messages that encode parameters for the smart contract, such as dates, times, conditions, and actions (e.g., transfer of control of digital assets) that are used to control the execution of the smart contract. For example, a smart contract (e.g., an executable program) may insure a party against delays of a particular flight, and execution of the program may include determining whether the particular flight was delayed using external data such as flight information of a particular commercial flight on a particular day. If the flight was delayed, a party of the program may receive a transfer of assets (e.g., a smart contract that provides travel insurance against delays).

In an embodiment, the smart contract 110 is encoded in a high-level programming language as source code such as C, C++, or Java. These are merely illustrative examples and the smart contract may be encoded using other suitable programming languages. In an embodiment, software such as a compiler, interpreter, and/or assembler may be utilized to transform the smart contract 110 to an arithmetic circuit which consists of "wires" that carry values from a field $\mathbb{F}$ and connect to addition and multiplication gates. It should be noted that the arithmetic circuit may refer to a logical circuit that can be implemented by a physical circuit comprising a series of physical gates (e.g., using transistor-transistor logic (TTL) integrated circuits such as 7400-series gates, flip-flops, buffers, decoders, multiplexers, and the like) connected by physical wires. While the execution of a smart contract 110 is described in the context of FIG. 1 and elsewhere, the use of a smart contract is merely one non-limiting example of source code that can be transformed to an arithmetic circuit. In an embodiment, a client (e.g., the first computing entity 102, either alone or in conjunction with the second computing entity 104) determines source code for performing a task defined by a set of operations, wherein execution of the task is delegated to a third computing entity 106 (referred to as a worker or prover). Generally speaking, a verifier may perform tasks associated with determining that the prover executed the task correctly, such as by verifying the validity of a proof of correct execution 116 generated by the prover.

A verifiable computation is a technique that allows the generation of proofs of computation. In an embodiment, such a technique is utilized by a client to outsource, to another computing entity referred to herein as a prover, the evaluation of a function f on an input x. In some cases, the client is computationally limited so that it is infeasible for the client to perform the evaluation of the function (e.g., the expected runtime of the calculation using computing resources available to the client exceeds a maximum acceptable threshold), although such need not be the case, and the client may, generally, speaking, delegate evaluation of the function f on the input x based on any suitable criterion, such as computational runtime, computational cost (e.g., the financial cost of allocating computing resources to perform the evaluation of the function), and more.

A prover, in an embodiment, is any suitable computing entity such as a blockchain node as described in greater detail elsewhere in the present disclosure. In an embodiment, a prover (e.g., a blockchain node) evaluates the function f on input x and generates an output y and a proof π of the correctness of the output y that can be verified by other computing entities such as the client as described above and/or other nodes of the blockchain network. Proofs, which may also be referred to as arguments, can be verified faster than doing the actual computational—accordingly, computational overhead can be reduced (e.g., reducing power overhead and the cost associated with powering and running computing resources) by verifying the correctness of the proof instead of re-computing the function f over input x to determine the correctness of the output generated by the prover described above. In zero-knowledge verifiable computation the prover provides an attestation to the client that the prover knows an input with a particular property.

An efficient variant of a zero-knowledge proof of knowledge is zk_SNARK (Succinct Non-interactive ARgument of Knowledge). In an embodiment, all pairings-based zk-SNARKs include a process where the prover computes a number of group elements using generic group operations and the verifier checks the proof using a number of pairing product equations. In an embodiment, the linear interactive proof works over a finite field and the prover's and verifier's message include, encode, reference, or otherwise include information usable to determine vectors of field elements.

In an embodiment, the first computing entity and/or the second computing entity agree on terms of execution of a smart contract by exchanging a set of messages that encode proposed parameters for the execution of the smart contract, such as one or more Boolean expressions that encodes a set of conditions that determine whether and/or how to execute the smart contract and a set of operations to perform based on a condition being satisfied. In an embodiment, one computing entity sends a set of parameters to the second computing entity as part of a protocol, and the second computing entity determines whether the parameters are acceptable for the smart contract. If the parameters are not accepted, the second computing entity may provide a different set of parameters to the first computing entity as a second proposed set of parameters for execution of the smart contract. The second computing entity may also provide a signal that the first set of parameters were not acceptable, and the first computing entity determines a second set of parameters to provide. In either case, once all parties have signalled agreement to the parameters, either computing entity can, in an embodiment, generate a locking transaction wherein one of the outputs is locked by the program (e.g., a smart contract script) and sends it to a counterparty of the smart contract. The locking transaction may refer to a transaction that initialises constraints upon which an unlocking transaction can be validated. In some examples, an "unlocking transaction" refers to a blockchain transaction that reassociates (e.g., transferring ownership or control) at least a portion of a digital asset, indicated by an UTXO of a previous transaction, to an entity associated with a blockchain address.

In an embodiment, the first computing entity generates a locking transaction and adds a transaction input that covers a portion of the worker fee. It should be noted that at this point, the locking transaction is not yet valid because the value of the transaction inputs is not equal to the value of the transaction outputs of the locking transaction. Continuing with the example, when the second computing entity receives the locking transaction, the second computing entity verifies the smart contract (e.g., verifies the common reference string and parameters for execution of the smart contract) and adds an input to the locking transaction and unlocks a UTXO to transfer to the issuer agreed upon digital assets and also a fee that is to be paid to the worker for execution of the program (e.g., smart contract) and an output that has a value of the fee to the worker. In cases where both the first computing entity and the second computing entity contribute transaction inputs to the smart contract, the smart contract may be jointly owned by both parties, and the transfer (e.g., exchange or sale) of the smart contract may require an attestation from both parties.

The smart contract 110 may be executed by a third computing entity 106 such as a node of a blockchain network. The third computing entity 106 may be referred to as a worker or a prover. In an embodiment, the worker executes the smart contract by at least performing a computational task that involves the computation of a function on an input. In an embodiment, the worker is any suitable computer system that the owner(s) of the smart contract may delegate a computational task to. An input, in an embodiment, includes information that attests to the worker's identity, such as a digital signature generated using a private key associated with the worker. In an embodiment, the worker is a computer system that the first and second computing entities agree to transfer digital assets to in return for successfully completing a computational task. The owner(s) of the smart contract, in an embodiment provides an input x and the evaluation key $E_K$ 112 to a prover, the prover uses an evaluation module to a compute routine to compute the output y (i.e., y=f(x) wherein the input is x and the function is f) and uses the evaluation key $E_K$ to produce a proof of correct execution 116, which may also be referred to as a proof-of-correctness elsewhere in this disclosure. In an embodiment, the worker is a computer system comprising hardware and/or software that includes instructions that, if executed by one or more processors of the computer system, cause the computer system to evaluate the values of the internal circuit wires of a QAP and produce an output y of the QAP.

In embodiments, an output $\mathcal{Y}$, values of the internal circuit wires (or a subset thereof), and the evaluation key $E_K$ are used to produce the proof-of-correctness. The proof $\pi$ can be stored on the blockchain and verified by multiple parties without requiring the worker to separately interact with the multiple parties. In this manner, a fourth computing entity (e.g., a verifier computer system) can validate the broadcasted transaction using the public verification key $V_K$ 114 and the proof $\pi$, thereby validating the smart contract. In some cases, the owner(s) of the smart contract may reclaim digital assets encumbered by the broadcasted transaction if the verification fails. In some cases, the owner(s) of the smart contract can perform the verification of the proof.

In an embodiment, the verification key 114 and the corresponding proof 116 are generated according to techniques described above and/or below. Accordingly, a verifier is given verification key $V_K$ and proof $\pi$:

$$V_K = \left\{ \begin{array}{c} \mathcal{P} \\ \mathcal{Q} \\ \alpha_v \mathcal{Q} \\ \alpha_w \mathcal{Q} \\ \alpha_w \mathcal{P} \\ \alpha_y \mathcal{Q} \\ \beta \mathcal{P} \\ \beta \mathcal{Q} \\ r_y t(s) \mathcal{P} \\ r_v v_i(s) \mathcal{P} \\ r_w w_i(s) \mathcal{Q} \\ r_y y_i(s) \mathcal{P} \end{array} \right\}_{i=0\ldots N}$$

-continued $$\text{Proof } \pi = \begin{cases} \sum_{i=N+1}^{m} a_i r_v v_i(s) \mathcal{P} \\ \sum_{i=N+1}^{m} a_i \alpha_v r_v v_i(s) \mathcal{P} \\ \sum_{i=N+1}^{m} a_i r_w w_i(s) \mathcal{Q} \\ \sum_{i=N+1}^{m} a_i \alpha_w r_w w_i(s) \mathcal{P} \\ \sum_{i=N+1}^{m} a_i r_y y_i(s) \mathcal{P} \\ \sum_{i=N+1}^{m} a_i \alpha_y r_y y_i(s) \mathcal{P} \\ \sum_{i=N+1}^{m} a_i (r_v \beta v_i(s) + r_w \beta w_i(s) + r_y \beta y_i(s)) \mathcal{P} \\ \sum_{i=0}^{d} h_i s^i \mathcal{Q} \end{cases}$$

such that the verifier computes a plurality of elliptic curve multiplications (e.g., one for each public input variable) and five pair checks, one of which includes an additional pairing multiplication.

Given verification key $V_K$, proof $\pi$, and $(a_1, a_2, \ldots a_N)$, to verify that $t(x)$ divides $p(x)$ and hence $(x_{N+1}, \ldots, x_m) = f(x_0, \ldots, x_N)$, the verifier proceeds as follows. First it checks all the three $\alpha$ terms:

$$e(\alpha_v r_v V_{mid}(s) \mathcal{P}, \mathcal{Q}) = e(r_v V_{mid}(s) \mathcal{P}, \alpha_v \mathcal{Q})$$

$$e(\alpha_w r_w W_{mid}(s) \mathcal{P}, \mathcal{Q}) = e(\alpha_w \mathcal{P}, r_w W_{mid}(s) \mathcal{Q})$$

$$e(\alpha_y r_y Y_{mid}(s) \mathcal{P}, \mathcal{Q}) = e(r_y Y_{mid}(s) \mathcal{P}, \alpha_y \mathcal{Q})$$

wherein $V_{mid}(S) = \sum_{i=N+1}^{m} a_i v_i(s)$, $W_{mid}(s) = \sum_{i=N+1}^{m} a_i w_i(s)$, and $Y_{mid}(s) = \sum_{i=N+1}^{m} a_i y_i(s)$. Then, the verifier checks the term $\beta$:

$$e(r_v V_{mid}(s) \mathcal{P} + r_y Y_{mid}(s) \mathcal{P}, \beta \mathcal{Q}) \cdot e(\beta \mathcal{P}, r_w W_{mid}(s) \mathcal{Q}) = e(Z_{mid}(s) \mathcal{P}, \mathcal{Q})$$

and $Z_{mid}(s) = \sum_{i=N+1}^{m} a_i (r_v \beta v_i(s) + r_w \beta w_i(s) + r_y \beta y_i(s))$. Finally, the verifier checks the divisibility requirement:

$$e(r_v V(s) \mathcal{P}, r_w W(s) \mathcal{Q}) = e(r_y Y(s) \mathcal{P}, \mathcal{Q}) \cdot e(r_y t(s) \mathcal{P}, h(s) \mathcal{Q})$$

wherein $r_v V(s) \mathcal{P} = \sum_{i=0}^{m} r_v a_i v_i(s) \mathcal{P}$, $r_w W(s) \mathcal{Q} = \sum_{i=0}^{m} r_w a_i w_i(s) \mathcal{Q}$, $r_y Y(s) \mathcal{P} = \sum i = 0^m r_y a_i y_i(s) \mathcal{P}$, and $h(s) \mathcal{Q} = \sum_{i=0}^{d} h_i \mathcal{Q}$.

Thus, upon considering the notation from the sections described above and the examples described in this disclosure, the verification comprises a set of pair checks of the following elements, in accordance with one embodiment:

$$e(\pi_2, V_K^2) = e(\pi_1, V_K^3)$$

$$e(\pi_4, V_K^2) = e(V_K^5, \pi_3,)$$

$$e(\pi_6, V_K^2) = e(\pi_5, V_K^6)$$

$$e((\pi_1 + \pi_6), V_K^2) = e(\pi_7, V_K^2)$$

$$e((a_0 V_K^{10} + a_1 V_K^{11} + a_2 V_K^{12} + a_3 V_K^{13} + a_4 V_K^{14} + \pi_2 + a_7 V_K^{15}),$$
$$(a_0 V_K^{16} + a_1 V_K^{17} + a_2 V_K^{18} + a_3 V_K^{19} + a_4 V_K^{20} + \pi_4 + a_7 V_K^{21})) =$$
$$e((a_0 V_K^{22} + a_1 V_K^{23} + a_2 V_K^{24} + a_3 V_K^{25} + a_4 V_K^{26} + \pi_6 + a_7 V_K^{15}), V_K^2) * e(V_K^9, \pi_8)$$

Figure 2:
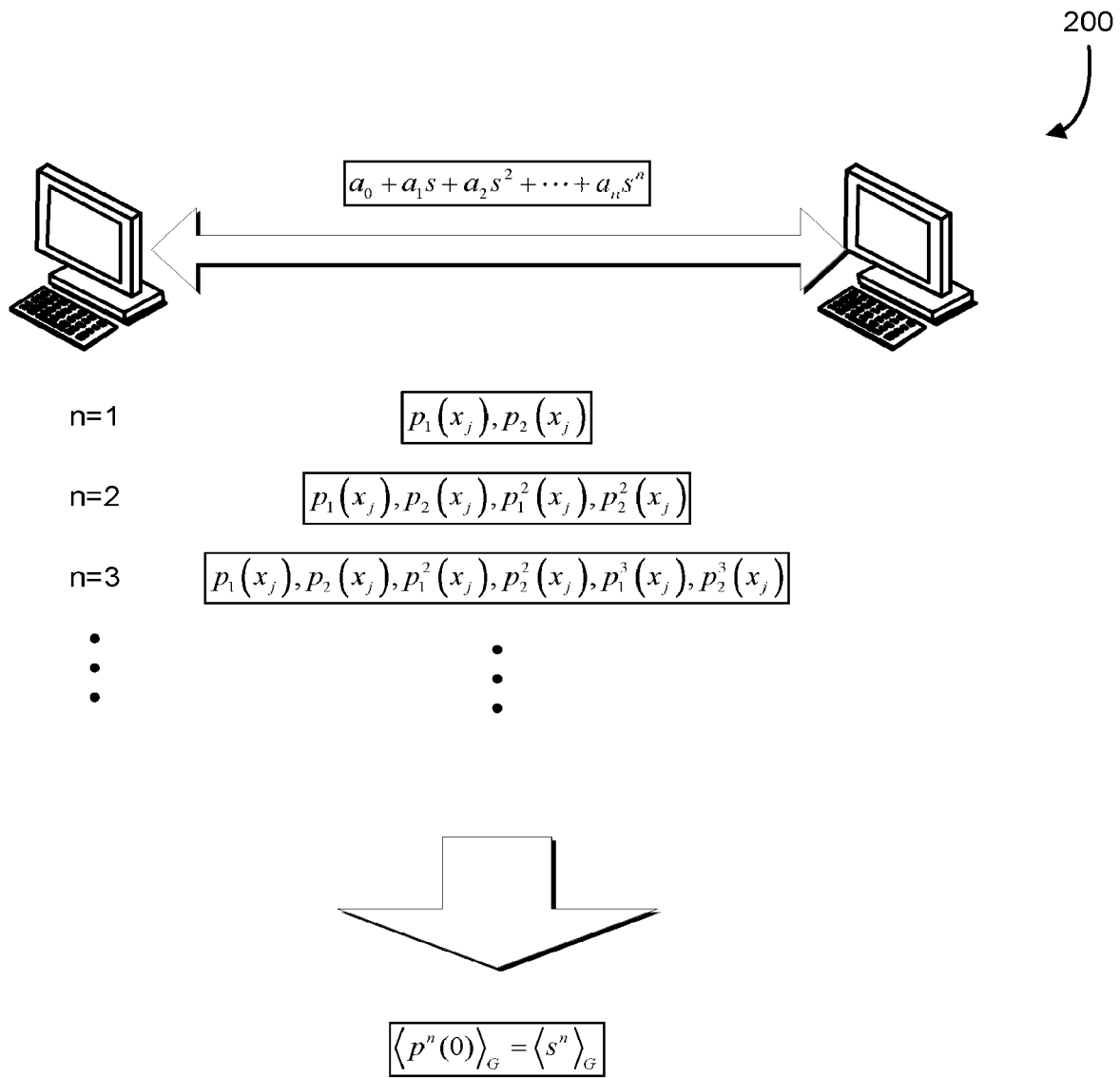
FIG. 2 illustrates a computing environment where a first computing entity and a second computing entity exchange quantities that can be used to determine powers of a shared secret between two or more parties.

FIG. 2 illustrates a computing environment 200 where a first computing entity 202 and a second computing entity 204 exchange quantities that can be used to determine powers of a shared secret between two or more parties. The first computing entity 202 and the second computing entity 204 may exchange quantities (as illustrated below the horizontal arrow illustrated in FIG. 2) that are used to calculate an identical common reference string. In an embodiment, the first computing entity and the second computing entity are nodes of a blockchain network that are in accordance with those described in connection with FIG. 1.

In accordance with at least one embodiment, let $F: \mathbb{F} \to \mathbb{F}$ be a function on field, and let $\mathcal{C}$ be the corresponding arithmetic circuit, and $\mathcal{Q} = (t(x), \mathcal{V}, \mathcal{W}, \mathcal{Y})$ the corresponding QAP (quadratic arithmetic program) of size m and degree d. Furthermore, let $e: \mathbb{G} \times \mathbb{G} \to \mathbb{G}_T$ be a bilinear mapping, and G a generator of $\mathbb{G}$. In an embodiment, the additive representation (as opposed to the exponential representation) is chosen. In an embodiment, an evaluation key and a verification key are chosen by: choosing random $r_v$, $r_w$, s, $\alpha_v$, $\alpha_w$, $\alpha_y$, $\beta$, $\gamma \in \mathbb{F}$, and setting $r_y = r_v \cdot r_w$, $r_v \cdot G = \langle g_v \rangle$ (generally: $\langle a \rangle = a \cdot G$), and correspondingly $\langle g_w \rangle$, $\langle g_y \rangle$, to construct the keys:

$$EK = (\{\langle v_k(s) \rangle\}_{k \in I_{mid}}, \{\langle w_k(s) \rangle\}_{k \in I_{mid}},$$
$$\{\langle y_k(s) \rangle\}_{k \in I_{mid}}, \{\langle \alpha_v v_k(s) \rangle\}_{k \in I_{mid}},$$
$$\{\langle \alpha_w w_k(s) \rangle\}_{k \in I_{mid}}, \{\langle \alpha_y y_k(S) \rangle\}_{k \in I_{mid}}, \{\langle s^i \rangle\}_{i \in [d]}, \{\langle \beta v_k(s) \rangle \langle \beta w_k(s) \rangle \langle \beta y_k(s) \rangle\}_{k \in I_{mid}})$$

and $$VK = (\langle 1 \rangle, \langle \alpha_v \rangle, \langle \alpha_w \rangle, \langle \alpha_y \rangle, \langle \gamma \rangle, \langle \beta \gamma \rangle, \langle t(s) \rangle, \{\langle v_k(s) \rangle \langle w_k(s) \rangle \langle y_k(s) \rangle\}_{k \in \{0\} \cup [N]}).$$

where $N = N_{in} + N_{out}$, i.e., the number of in- and outputs. In an embodiment where an asymmetric pairing is considered, the pairing mapping would be defined as: $e: \mathbb{G}_1 = \mathbb{G}_2 \to \mathbb{G}_T$, and $G_i$ a generator of $\mathbb{G}_i$, $i = 1, 2$. In that case the CRS would change slightly and the VK would be $$VK = (\langle 1 \rangle_1, \langle 1 \rangle_2, \langle \alpha_v \rangle_2, \langle \alpha_w \rangle_2, \langle \alpha_w \rangle_1, \langle \alpha_y \rangle_2,$$
$$\langle \beta \rangle_1, \langle \beta \rangle_2, \langle r_y t(s) \rangle_1, \{\langle v_k(s) \rangle_1 \langle w_k(s) \rangle_2$$
$$\langle y_k(s) \rangle_1\}_{k \in \{0\} \cup [N]}.$$

As indicated, circuits are described by means of polynomials v, w, which, in turn, are evaluated in a secret s, which is only known to the party owning/creating the circuits and corresponding QAP (e.g., the owners of the smart contract).

More precisely, as described above, the client generates the elements:

$$r_v, r_w, s, \alpha_v, \alpha_w, \alpha_y, \beta, \gamma \xleftarrow{R} \mathbb{F}_r^*$$

Whereas the security of the proposed solution relies on the parameter, s, in some embodiments, exposing the remaining ($r_v$, $r_w$, $\alpha_v$, $\alpha_w$, $\alpha_y$, $\beta$, $\gamma$) may reveal information that does not render the system zero-knowledge and/or that the client does not want other entities to know about.

In an embodiment, for solutions where a worker is required to provide a proof-of-correctness, there may exist an OP_code (or equivalents) for verifying the proof-of-correctness against a verification key.

It should be noted that throughout this disclosure, unless otherwise stated, the polynomials in this paper are defined over a field, $\mathbb{F}_r$. Thus, let ($\mathbb{F}_r$, +,•) be a field. Accordingly, a polynomial over $\mathbb{F}_r$ is given by P: $\mathbb{F}_r \to \mathbb{F}'$ $$P(x) = \sum_{i=0}^{n} a_i x^i$$

where $a_i \in \mathbb{F}$.

In an embodiment, the common reference string is expressed by means of the polynomials v(x), w(x) evaluated in a secret, s, expressed in the form:

$$v(s) = a_0 + a_1 s + a_2 s^2 + \ldots + a_n s^n$$

$$w(s) = b_0 + b_1 s + b_2 s^2 + \ldots + b_n s^n$$

In an embodiment, techniques described herein are utilised to determine and share elliptic curve points of form: $\langle v(s) \rangle_G = \langle a_0 \rangle_G + \langle a_1 s \rangle_G + \langle a_2 s^2 \rangle_G + \ldots$, for a generator G of the associated group (e.g., of elliptic curve points). Thus, in an embodiment, systems and methods described herein are utilised to determine and distribute $s^r G = \langle s^r \rangle_G$, for arbitrary integer powers r.

Techniques to share and distribute $\langle s^r \rangle_G$, in accordance with at least one embodiment, are illustrated in FIG. 2. As an example, the n=2 case is described in greater detail below in connection with FIG. 2, and should be considered a non-limiting example of sharing powers of secrets between parties of a smart contract. Furthermore, it is noted, that in various embodiments described herein, the equivalent of a threshold is given a priori and it is assumed that the necessary number of participants first agree.

FIG. 2 illustrates techniques to share and distributed powers of a shared secret in the case of two participants, in accordance with at least one embodiment. As illustrated in FIG. 2 and in accordance with at least one embodiment, exactly two parties are participants that share powers of a shared secret (i.e., n=2 case). The first and second computing entities may respectively be referred to as A and B. In an embodiment, A and B may exchange the following information: A sends $\langle p_1(x_i) \rangle_G$ to B, and receives $\langle p_2(x_i) \rangle_G$ in return (i∈{1, 2}). In this way, both can calculate $$\langle p(x_i) \rangle_G = \langle p_1(x_i) + p_2(x_i) \rangle_G$$

Using Lagrange interpolation (Lagrange Polynomial, n.d.) it is possible to express p in terms of $p(x_1)$ and $p(x_2)$:

$$p(x) = p(x_1)\frac{x-x_2}{x_1-x_2} + p(x_2)\frac{x-x_1}{x_2-x_1} = \frac{p(x_1)-p(x_2)}{x_1-x_2}x + \frac{-p(x_1)x_2 + p(x_2)x_1}{x_1-x_2}$$

and, by extension, $\langle p(x) \rangle_G$ by means of $\langle p(x_i) \rangle_G$ (see WP0559). While the participants cannot reconstruct p(x), they can reconstruct $\langle p(x) \rangle_G$ (and in particular $\langle p(0) \rangle_G$), by means of the exchanged points $\langle p_1(x_j) \rangle_G$. This is true about higher powers of $\langle p^n(x) \rangle_G$ as well. As a result of the multinomial formula (Multinomial Theorem, n.d.):

$$\langle p^n(x_j) \rangle_G = \langle [p_1(x_j) + \ldots + p_m(x_j)]^n \rangle_G =$$

$$\left\langle \sum_{k_1+k_2+\ldots+k_m=n} \binom{n}{k_1, k_2, \ldots, k_m} \prod_{t=1}^{m} p_t^{k_t}(x_j) \right\rangle_G$$

For m=2 this becomes:

$$\langle p^n(x_j) \rangle_G = \langle [p_1(x_j) + p_2(x_j)]^n \rangle_G = \left\langle \sum_{k_1+k_2=n} \binom{n}{k_1, k_2} \prod_{t=1}^{2} p_t^{k_t}(x_j) \right\rangle_G$$

which, in turn, yields the following "tower" of terms (here i=1, 2):

| n | Terms that need to be exchanged (multiplied by G, and j = 1, 2) |
|---|---|
| 1 | $p_1(x_j), p_2(x_j)$ |
| 2 | $p_1(x_j), p_2(x_j), p_1^2(x_j), p_2^2(x_j)$ (optionally: $p_1(x_j) \cdot p_2(x_j)$) |
| 3 | $p_1(x_j), p_2(x_j), p_1^2(x_j), p_2^2(x_j), p_1^3(x_j), p_2^3(x_j)$ (optionally: $p_1(x_j) \cdot p_2(x_j), p_1^2(x_j) \cdot p_2(x_j), p_1(x_j) \cdot p_2^2(x_j)$) |
| . | |
| . | |
| . | |

Schematically the exchange could look like the following (for some $x_1$):

| Step | A ↔ B |
|---|---|
| 1 | A: for j = 1, 2 and k = 1, 2, . . . : send $\{\langle p_1^k(x_j) \rangle_G\}$ to B |
| 2 | B: for j = 1, 2 and k, k' = 1, 2, . . . : send $\{\langle p_2^k(x_j) \rangle_G\}$, (and optionally) $\{\langle p_1^k(x_j) \cdot p_2^{k'}(x_j) \rangle_G\}$ to A |

After this exchange (following certain, pre-arranged conventions) both parties can calculate $\langle p^n(x_j) \rangle_G$ and, in particular, $\langle p^n(0) \rangle_G = \langle s^n \rangle_G$.

Figure 3:
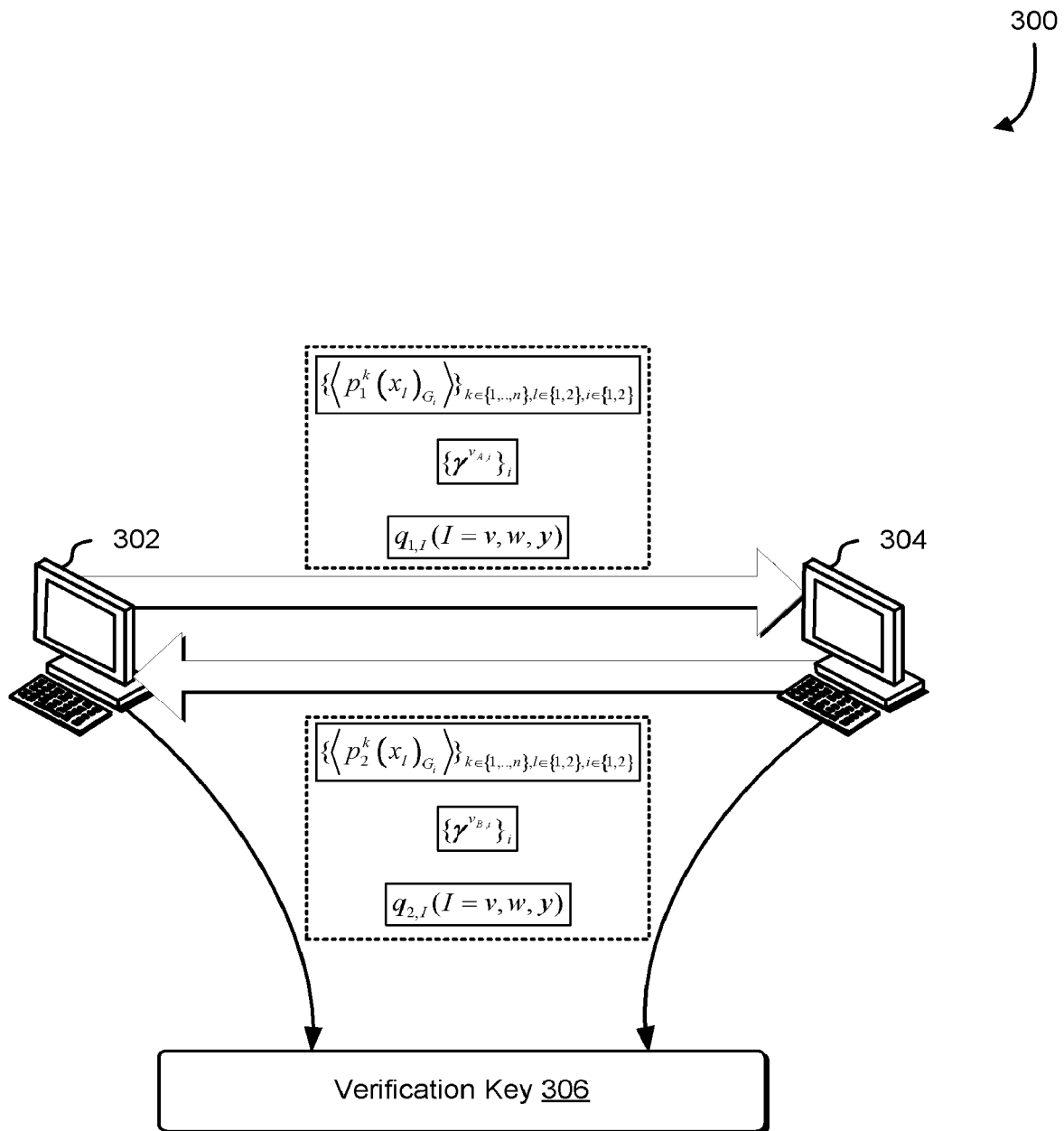
FIG. 3 illustrates a computing environment in which a first computing entity and a second computing entity exchange a set of parameters that renders a zero-knowledge.

FIG. 3 illustrates a computing environment 300 in which a first computing entity 302 and a second computing entity 304 exchange a set of parameters that renders a protocol—such as those described in connection with FIG. 1—zero-knowledge. In accordance with various embodiments, a public verification key may take on the form:

$$VK = (\langle 1 \rangle_1, \langle 1 \rangle_2, \langle \alpha_v \rangle_2, \langle \alpha_w \rangle_2, \langle \alpha_w \rangle_1, \langle \alpha_y \rangle_2,$$
$$\langle \beta \rangle_1, \langle \beta \rangle_2, \langle r_y t(s) \rangle_1, \{\langle v_k(s) \rangle_1 \langle w_k(s) \rangle_2$$
$$\langle y_k(s) \rangle_1\}_{k \in \{0\} \cup [N]})$$

Whereas the security of the proposed solution relies on the parameter, s, in some embodiments, exposing the remaining ($r_v, r_w, \alpha_v, \alpha_w, \alpha_y, \beta, \gamma$) may reveal information that does not render the system zero-knowledge and/or that the client does not want other entities to know about. Accordingly, in an embodiment, some or all of the remaining parameters used to generate a verification key 306 are shared using techniques described in connection with FIG. 3.

In an embodiment, polynomials are exchanged between the first computing entity 302 and the second computing entity 304 (which may be referred to as, respectively, A and B) according to techniques described elsewhere in this disclosure, such as those discussed in connection with FIGS. 1, 2 and 4. Accordingly, in an embodiment, the first computing entity 302 computes and shares a set of elliptic curve points $\{\langle p_1^k(x_l) \rangle_{G_i}\}_{k \in \{1, \ldots, n\}, l \in \{1,2\}, i \in \{1,2\}}$ to the second computing entity 304 and the second computing entity 304 computes and shares a set of elliptic curve points $\{\langle p_2^k(x_l)\rangle_{G_l}\}_{k\in\{1,\ldots,n\}, l\in\{1,\ldots,n\}, i\in\{1,\ldots,n\}}$ to the first computing entity 302. Additionally, other parameters used to generate the verification key 306 may not be revealed in a plaintext format across a communications channel and instead transmitted using techniques described hereinbelow.

Let $G_i$ be a generator of $\mathbb{G}_i$, $i=1, 2$, and $\langle p_k(s)\rangle_i = r_p \cdot p_k(s) \cdot G_i$ for p=v, w, y, according to an embodiment. Further, in an embodiment, $\langle p_k^i(s)\rangle_{G_i}$ are shared, and the other parameters are propagated in a manner that ensures the confidentiality of the parameters (e.g., encryption or other concealment techniques). It is noted that either of the participants may, conversely, generate the parameters $r_v$, $r_w$, $\alpha_v$, $\alpha_w$, $\alpha_y$, $\beta$, $\gamma \in \mathbb{F}$, and transfer them to the other, either off-or online (e.g., on-chain). Regarding the former—that is, ensuring confidentiality of the other parameters—various techniques may be utilized. For example, by using Shamir's Secret Sharing Scheme (4S) to share the elements $\langle \alpha_v\rangle_2$, $\langle \alpha_w\rangle_2$, $\langle \alpha_w\rangle_1$, $\langle \alpha_y\rangle_2$ (and possibly $\langle \beta\rangle_1$, $\langle \beta\rangle_2$, depending on implementation/protocol) and/or using a Diffie-Hellman like secret generation for $r_v$, $r_w$, $\beta$, $\gamma$.

In an embodiment, the elements $\langle \alpha_v\rangle_2$, $\langle \alpha_w\rangle_2$, $\langle \alpha_w\rangle_1$, $\langle \alpha_y\rangle_2$, $\langle \beta\rangle_1$, $\langle \beta\rangle_2$, or some combination thereof are of the form $\langle a\rangle_i = a \cdot G_i$. Like in the case of s, each participant, i, generates a polynomial, $q_i$, evaluates it in $x_j$, $j \in \{1, \ldots, m\}$, and shares the corresponding $q_i(x_j)$ with participant j. Each participant can thus determine $\langle q(x)\rangle_{G_i} = \Sigma_j \langle q_i(x)\rangle_{G_i}$ and, in particular, $q(0) \cdot G_i = \langle q(0)\rangle_i$ where $q(0)$ can be $\alpha_v$, $\alpha_w$, $\alpha_y$, $\beta$, or some combination thereof, the particular combination of which may be based on a protocol/convention, such as a zk_SNARKs protocol.

In an embodiment, the α-parameters are shared by means of elliptic curve points whereas other parameters may by scalar values. For such values, in accordance with at least one embodiment, a Diffie-Hellman scheme is used to share scalar parameters between the two computing entities, without sharing the parameters themselves. Accordingly, in an embodiment, let $P = \{t_1, \ldots, t_N\}$ be a set of N parameters. In an embodiment, it is assumed that A and B have agreed on using a multiplicative group $\Gamma$ with modulus $\mu$ and generator $\gamma$, and the participants (A and B) proceed with following the steps (while the exponential representation is used here as an illustrative example, others suitable representations may be utilised): for each $i \in \{1, \ldots, N\}$, the first and second computing entities create a (private) random number $v_{A,i}$, $v_{B,i}$, respectively and both derive a (public) element: $\gamma^{v_{A,i}}$ and $\gamma^{v_{B,i}}$. The computing entities then exchange $\gamma^{v_{A,i}}$ and $\gamma^{v_{B,i}}$, and calculate $(\gamma^{v_{B,i}})^{v_{A,i}}$ and $(\gamma^{v_{A,i}})^{v_{B,i}}$ $(=(\gamma^{v_{B,i}})^{v_{A,i}} = \gamma^{v_{A,i}v_{B,i}})$, respectively. Accordingly, the parameters are set $t_i = \gamma^{v_{A,i}v_{B,i}}$.

Accordingly, the techniques above have demonstrated that both the first and second computing entities share the parameters $t_i$ without having exchanged them by, instead, exchanging $\gamma^{v_{A,i}}$ and $\gamma^{v_{B,i}}$. It should be noted that in accordance with at least one embodiment, the number of participants is limited to n=2 as a result of at least one parameter being exchanged in the preceding manner.

Figure 4:
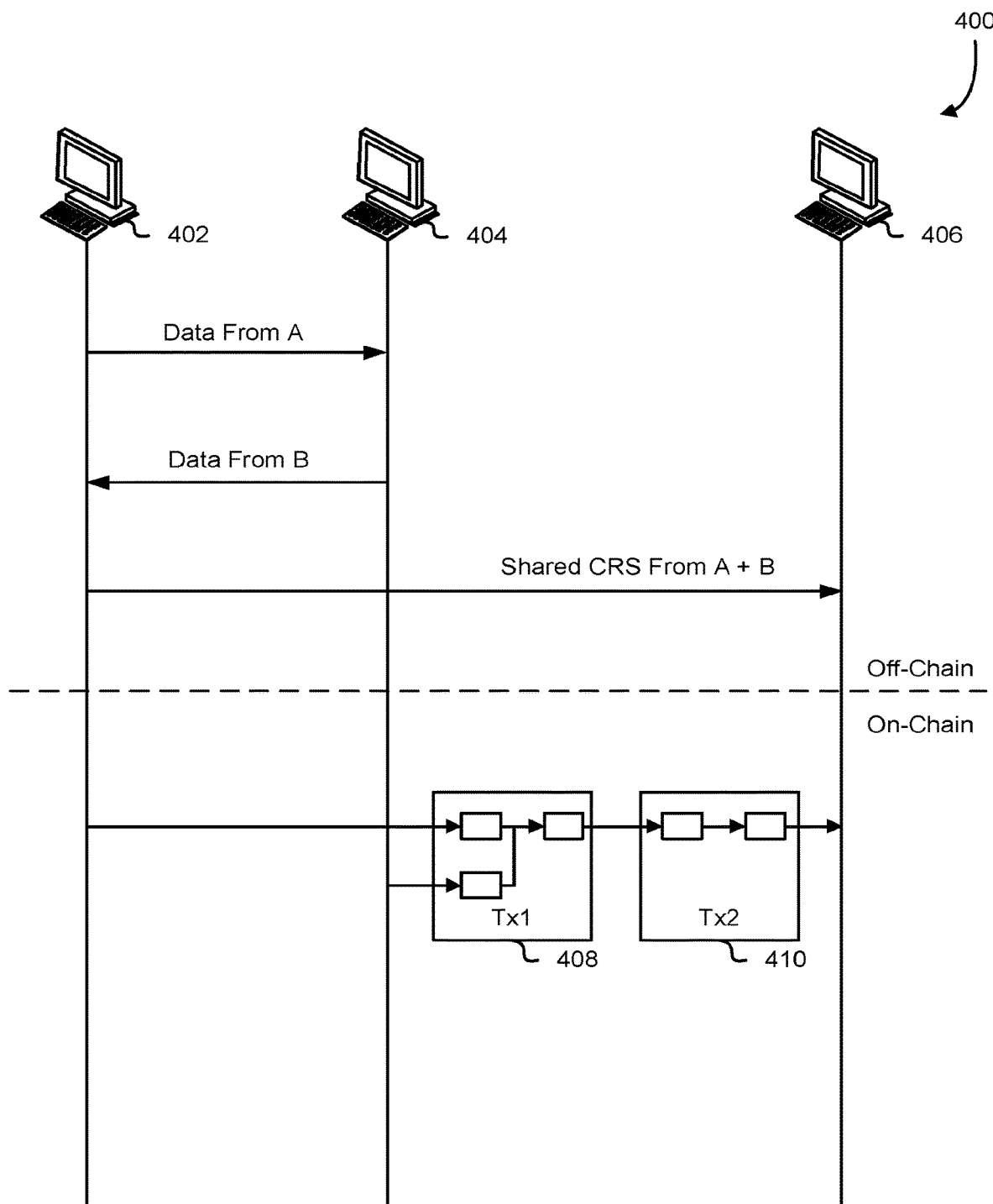
FIG. 4 illustrates a diagram of a protocol based on a two-party common reference string (CRS) and corresponding proof-of-correctness (POC) or proof of correct execution.

FIG. 4 illustrates a diagram 400 of a protocol based on a two-party common reference string (CRS) and corresponding proof-of-correctness (POC) or proof of correct execution. The diagram 400 illustrates a first computing entity 402, a second computing entity 404, and a third computing entity 106 wherein the first computing entity 402 and the second computing entity 404 jointly make contributions to a smart contract that can be unlocked by the third computing entity 406 upon execution of the smart contract. In an embodiment, the protocol is implemented at least in part using a blockchain network.

In accordance with this disclosure, and described in greater detail (e.g., in connection with FIG. 4), a scheme and protocol for two participants, A and B, may be utilised to generate a shared secret and, thus, a shared common reference string (CRS) which can be used to verify the correct execution of an associated circuit. In an embodiment, the scheme assumes an off-chain exchange of data, first between A and B, and secondly between A+B (or either) and a worker C that performs a computational task on behalf of at least one of A or B. To cause the worker C to perform the computational task (e.g., execution of a smart contract), A and B both sign a transaction (which may or may not contain a P2SH-type redeem script), which requires the worker C to provide a proof-of-correctness and prove possession of correct verification key (VK) in order to unlock the funds.

Techniques for implementing the protocol as presented in this disclosure, in some embodiments, do not require any protocol changes to existing blockchain networks (e.g., may be implemented on a Bitcoin-based blockchain network using existing commands that are already supported). In some embodiments, extensions to the existing set of commands supported by the Bitcoin protocol are also discussed herein—the extensions may include new commands (e.g., new OP codes) that may have various benefits such as improving efficiency of the execution of smart contracts, reducing the size of the smart contract (which may reduce the amount of storage space needed by nodes of the blockchain network to properly operate), and more. In some embodiments, the cost of confirming a smart transaction to the blockchain is based at least in part on the size of the smart contract.

In an embodiment, the exchange and transfer of elliptic curve points and other data pertaining to the common reference string are transferred off-chain. In an embodiment, the verification key is eventually broadcast or otherwise made available on-chain via the exchange of digital assets for work (e.g., execution of a smart contract) carried out by the worker C and two parties wishing to evaluate their smart contract (A and B). As described herein, several schemes are possible. For instance, A and B may or may not both supply the VK or hashes of VK when preparing the locking transaction. In other words, in an embodiment, the majority of the capacity-intensive workload is done off-chain.

In an embodiment, the protocol includes both off-chain and on-chain components, as denoted by the dotted line illustrated in FIG. 4. Off-chain components may include communications and exchanges of data and information that can occur without storing data to a blockchain ledger. For example, an off-chain component of the protocol may include an exchange of IP packets between a source and destination (e.g., the first computing entity 402 is a source that transmits a first set of parameters to a destination, the second computing entity 404). For example, an on-chain component of the protocol may include broadcasting data to a blockchain ledger that is made available to nodes of the blockchain network.

In an embodiment, the first computing entity 402 computes, based at least in part on a first polynomial, a set of elliptic curve points $\{\langle p_1^k(x_l)\rangle_{G_i}\}_{k\in\{1,\ldots,n\}, l\in\{1,2\}, i\in\{1,2\}}$. The first computing entity 402 may transmit data to the second computing entity 404 comprising at least some of the set of elliptic curve points. For example, the first computing entity 402 may transmit the entire set of elliptic curve points. As a second example, the first computing entity 402 may transmit a subset of the elliptic curve points $\{\langle p_1^k(x_2)\rangle_G\}_{k\in\{1,\ldots,n\}}$.

In some embodiments, additional data is transmitted that is not required to maintain the secrecy of a share secret s, but may be necessary to render the system zero-knowledge. For example, $\{\gamma^{v_{A,i}}\}_{i\in\{1,\ldots,N\}}$, $q_{1,I}$ (I=v, w, y), or some combination thereof may also be computed (as described above in connection with FIG. 3) to generate additional parameter values that can be used as part of determining a common reference string. In an embodiment, $\{\gamma^{v_{A,i}}\}_{i\in\{1,\ldots,N\}}$ is a set of scalar values. In an embodiment, $q_{1,I}$ (I=v, w, y) refers to a set of elliptic curve points.

In an embodiment, the second computing entity 404 likewise computes, based on a polynomial that may be different from that used by the first computing entity 402, a set of elliptic curve points $\{\langle p_2^k(x_l)\rangle_G\}_{k\in\{1,\ldots,n\},l\in\{1,2\},i\in\{1,2\}}$. The second computing entity 404 may perform similar operations as described above. For example, the second computing entity 404 may transmit a subset of the generated elliptic curve points $\{\langle p_2^k(x_1)\rangle_G\}_{k\in\{1,\ldots,n\}}$ to the first computing entity 402. Additionally, in an embodiment, optional parameters such as $\{\gamma^{v_{B,i}}\}_i$, $q_{2,I}$ (I=v, w, y), or some combination thereof may be exchanged, which, while not being necessary to maintain the secrecy of the shared secret s, may be utilised to ensure that the protocol is zero-knowledge.

In an embodiment, the exchanged quantities can be utilised by both the first computing entity 402 and the second computing entity 404 to calculate the identical common reference string. They may or may not provide the third computing entity (e.g., worker) with the common reference string, as the third computing entity 406 has to prove possession of the correct verification key later on. The determination of the same common reference string by both the first and second computing entities may be performed off-chain.

Continuing with the protocol, in accordance with one embodiment, the first and second computing entities agree on a transaction in which they make proportionate contributions for the execution of the smart contract. In an embodiment, the first and second computing entities agree upon a proportion of contributions and each provide transaction inputs that are encumbered to the smart contract and can be unlocked by the third computing entity upon execution of the smart contract. This may or may not be a pay-to-script-hash (P2SH) type agreement where they both transfer funds to the same address (an address of C). The P2SH type script may or may not contain the elements of the verification key or hash-values of verification key, i.e., $h_i$=HASH(VK$_i$). In an embodiment, the key has been divided into chunks. The smart contract may be broadcast to a blockchain as the first transaction 408 illustrated in FIG. 4 having a first transaction input contributed by the first computing entity 402 and a second transaction input contributed by the second computing entity 404 that serves as a worker fee paid in a proportion agreed upon by the first and second computing entities.

In an embodiment, the third computing entity 406—also referred to as a worker—unlocks the funds in a second transaction 410 according to the protocols in U.K. Patent Application No. 1719998.5 and/or U.K. Patent Application No. 1720768.9—and the third computing entity 406 unlocks the funds for the work (correct execution of the circuit) and in doing so, proves that it has possession of (a) the correct verification key and (b) a valid proof-of-correctness. The verification may be performed by another computer system (e.g., a node of the blockchain that is a verifier) or by either/both of the computing entities that are a party to the smart contract.

Figure 5:
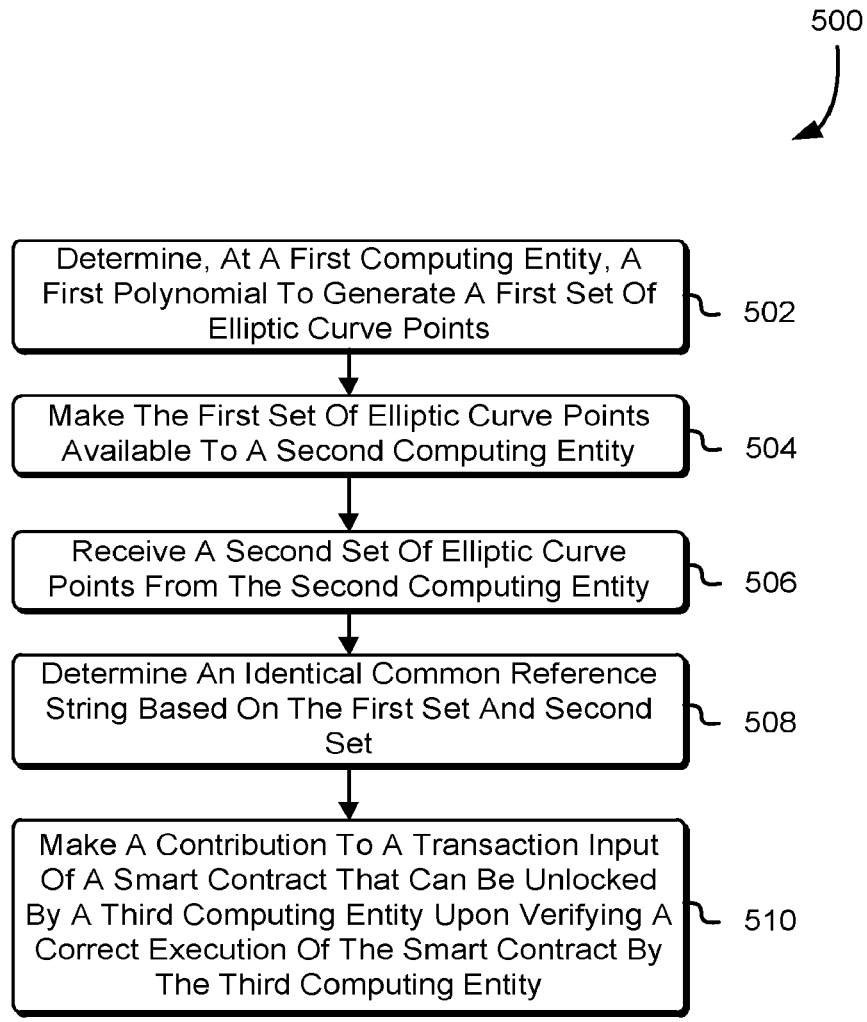
FIG. 5 illustrates a process for generating a two-party common reference string comprising a verification key and evaluation key, in accordance with an embodiment.

FIG. 5 shows an illustrative example of a process 500 for generating a two-party common reference string comprising a verification key and evaluation key, in accordance with an embodiment. Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

In an embodiment, the system performing the process 500 is a computing entity that is a party to a smart contract that performs a process to at least establish information that can be used by the system and another party of the smart contract to calculate an identical common reference string. A common reference string described in connection with the process 500 may be in accordance with those discussed in connection with, for example, FIGS. 1-4. In an embodiment, the common reference string is expressed by means of the polynomials v(x), w(x) evaluated in a secret s of the form:

$$v(s)=a_0+a_1s+a_2s^2+\ldots+a_ns^n$$

$$w(s)=b_0+b_1s+b_2s^2+\ldots+b_ns^n$$

In an embodiment, the first computing entity determines 502 a first polynomial to generate a first set of elliptic curve values. In an embodiment, the system generates elliptic curve points of form: $\langle v(s)\rangle_G=\langle a_0\rangle_G+\langle a_1s\rangle_G+\langle a_2s^2\rangle_G+\ldots$, for some generator G of the associated group (e.g., of elliptic curve points). Unless otherwise noted, the polynomials in this process 500 are defined over a field, $\mathbb{F}_r$. Thus, let ($\mathbb{F}_r$, +,·) be a field. Then, a polynomial over $\mathbb{F}_r$ is given by P: $\mathbb{F} \to \mathbb{F}$ ' and $P(x)=\Sigma_{i=0}a_ix^i$ where $a_i\in\mathbb{F}$. The set of elliptic curve points may be represented as $\{\langle p_1^k(x_l)\rangle_{G_i}\}_{k\in\{1,\ldots,n\},l\in\{1,2\},i=1}$.

The first computing entity may make 504 the set of elliptic curve points available to the second computing entity. In an embodiment, the system need not make the entire set of elliptic curve points available to the second computing entity—rather in an embodiment, the system transmits a subset of the elliptic curve points $\{\langle p_1^k(x_2)\rangle_G\}_{k\in\{1,\ldots,n\}}$.

For example, in accordance with at least one embodiment, where n=2, the first computing entity computes $\{p_1(x_1),$ $p_1^2(x_1)$, $p_1(x_2)$, $p_1^2(x_2)\}$ and shares, with the second computing entity, $\{p_1(x_2), p_1^2(x_2)\}$. The remaining quantities $\{p_1(x_1), p_1^2(x_1)\}$ may be utilised by the first computing entity to calculate the common reference string.

The second computing entity, which is also a party to the smart contract, may separately generate a set of elliptic curve points for the same input points (e.g., generate elliptic curve points $\{\langle p_2^k(x_1)\rangle_G\}_{k\in\{1,\ldots,n\}}$) and provide either all or some of the generated points to the first computing entity. The first computing entity may receive 506, from the second computing entity, a second set of elliptic curve points that correspond to some or all of the elliptic curve points generated by the second computing entity, wherein the subset may be determined based on techniques described elsewhere in this disclosure (e.g., in connection with FIGS. 2 and 6).

In an embodiment, the system determines 508 an identical common reference string based on at least a portion of the first and second sets of elliptic curve points. For example, after the exchange of elliptic curve points, a Lagrange interpolation may be utilised to express p in terms of $p(x_1)$ and $p(x_2)$. In an embodiment, both parties of the smart contract can reconstruct powers $\langle p^n(x)\rangle_G$ (and in particular, $\langle p^n(0)\rangle_G = \langle s^n\rangle_G$), by means of the exchanged points $\langle p_i(x_j)\rangle_G$. For powers $\langle p^n(x)\rangle_G$, the multinomial formula as described above may be utilised:

$$\langle p^n(x_j)\rangle_G =$$

$$\langle [p_1(x_j) + \ldots + p_m(x_j)]^n\rangle_G = \left\langle \sum_{k_1+k_2+\ldots+k_m=n} \binom{n}{k_1, k_2, \ldots, k_m} \prod_{t=1}^{m} p_t^{k_t}(x_j)\right\rangle_G.$$

For example, for m=2 this becomes:

$$\langle p^n(x_j)\rangle_G = \langle [p_1(x_j) + p_2(x_j)]^n\rangle_G = \left\langle \sum_{k_1+k_2=n} \binom{n}{k_1, k_2} \prod_{t=1}^{2} p_t^{k_t}(x_j)\right\rangle_G.$$

In an embodiment, additional parameters (e.g., scalar values and/or elliptic curve points) are exchanged between the first and second computing entities, such as in the manner described in connection with FIG. 3, and the parameters, in conjunction with a power of the shared secret $\langle s^n\rangle_G$ are utilised to compute the verification key and/or evaluation key. In an embodiment, the parameters are exchanged without reliance on encryption and/or communications channels that provide cryptographically verifiable assurances of confidentiality.

In an embodiment, the first and second computing entities agree on a transaction and each makes 510 a contribution to a respective transaction input of the smart contract which can be unlocked by a third computing entity (e.g., worker) that correctly executes the smart contract. In an embodiment, either of the computing entities provides a proportionate worker fee. There may or may not be a P2SH type agreement in which both make contributions to the same address (e.g., address for worker). In an embodiment, the P2SH script includes elements of the verification key or hash values of the verification key. A worker (e.g., third computing entity) may unlock (e.g., unlock) the contributions by providing a computationally verifiable attestation that the worker has the correct verification and provides a valid proof of correctness, for example, by using techniques described in connection with U.K. Patent Application No. 1719998.5 and/or U.K. Patent Application No. 1720768.9.

Figure 6:
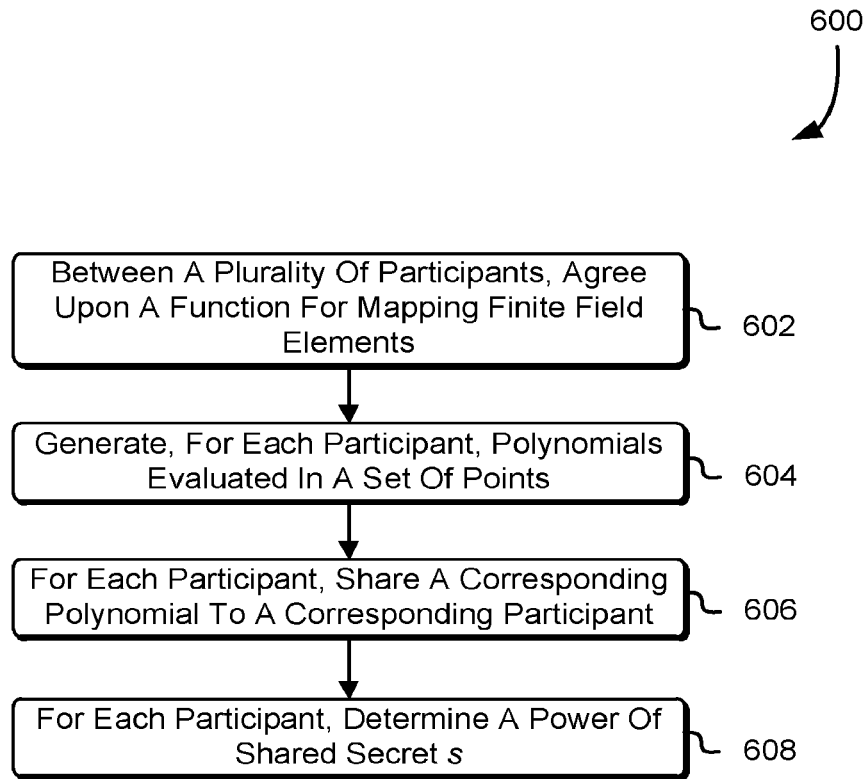
FIG. 6 illustrates a process for sharing powers of a shared secret between multiple parties, in accordance with at least one embodiment.

FIG. 6 shows an illustrative example of a process 600 for sharing powers of a shared secret between n parties (e.g., n>2), in accordance with at least one embodiment. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. In an embodiment, the equivalent of a threshold is given a priori and it is assumed that the necessary number of participants first agree. This differs from various existing techniques, such as those described in Shamir's Secret Sharing Scheme (4S), wherein the sharing of a secret only works under the limitation that a given threshold is reached.

Secret sharing, in accordance with various embodiments, is valid for an arbitrary number of parties. In an embodiment, large parts of the formalism described in this disclosure can be applied to multi-party (n>2) scenarios. In some embodiments, multi-party systems (n>2) are not required to conceal certain other parameters (e.g., some or all of the following non-elliptic curve (e.g., scalar) parameters: $r_v$, $r_w$, $\alpha_v$, $\alpha_w$, $\alpha_y$, $\beta$, $\gamma$). If, however, those parameters are to remain private according to the protocol, different approaches—such as those described in connection with FIG. 3—may be utilised to conceal parameters such as $r_v$, $r_w$.

In an embodiment, all participants agree 602 upon and/or have access to the function $f: \mathbb{F} \to \mathbb{F}'$ which maps finite field elements to other finite field elements. The functions, in an embodiment, serve as coefficients/exponents of generators of groups. For illustrative purposes, embodiments described hereinafter focus on polynomials since the functions we are interested in can be expressed in terms of polynomials by means of generalisations of Taylor series. In particular, in various embodiments, the parties involved evaluate the functions in the same value and without passing the value around amongst themselves. For example, in the case of a polynomial of order 1, this amounts to utilising Shamir's Secret Sharing Scheme. For higher orders (n>1), the parties are dealing with expressions of the form:

$$f(s) = a_0 + a_1 s + a_2 s^2 + \ldots + a_n s^n$$

Accordingly, techniques described herein can be utilised to ensure that all participants have the same $\langle f(s)\rangle_G$. For example, in a protocol described in accordance with at least one embodiment, the same EQ_FSG can be shared among two or more participants (i.e., n>1) by publically distributing points in the form $\langle s^r\rangle_G$, for arbitrary integer powers r, since $\langle f(s) \rangle_G = \langle a_0 \rangle_G + \langle a_1 s \rangle_G + \langle a_2 s^2 \rangle_G + \ldots$, where G is a generator of the group in question (e.g., of elliptic curve points).

In an embodiment, each participant is able to generate 604 polynomials, which are evaluated in a set of points ($x_1$, $x_2$, ...) with $x_i \neq 0$ $\forall i$, and the points may be known to all parties. In an embodiment, the sum of the polynomials of each participant makes up the (master) polynomial, of which the intersection with the y-axis is the secret, i.e., $$p(x) = \Sigma_{j=1}^m p_j(x)$$

with $p(0)=s$, and where m is the number of participants. The intersection with the y-axis as described above may be referred to as an intersection point.

In order to establish s, each participant shares 606 a corresponding polynomial evaluated in the different points ($x_1$, $x_2$, ...). More specifically, participant i creates/calculates $p_i(x_j)$ for i,j∈{1, ..., m}, and sends off $\langle p_i(x_j) \rangle_G$ to j. Once these quantities are shared, each participant is able to calculate or otherwise determine 608 a power of the shared secret $s^r$.

Slightly more scrutiny is needed when considering $s^r$, since it amounts to sharing representations of $$s^r = (p(0))^r = (\Sigma_{j=1}^m p_j(0))^r$$

It may not possible to calculate powers of $\langle p_i(x_j) \rangle_G$ because powers of the generator are generally not defined. However, since all participants can infer $\langle s \rangle_G$ by means of the exchanged $\langle p_i(x_j) \rangle_G$, it is possible to start by examining powers of the Lagrange interpolation polynomial L(x) (as the master polynomial generally can be constructed by means of Lagrange interpolation (Lagrange Polynomial, n.d.)). The Lagrange interpolation can be written as:

$$L(x) = \sum_{j=1}^m p(x_j) l_j(x)$$

where $$l_j(x) = \prod_{\substack{1 \leq k \leq m \\ k \neq j}} \frac{x - x_k}{x_j - x_k}$$

and thus:

$$L^r(x) = \left( \sum_{j=1}^k p(x_j) l_j(x) \right)^r = \sum_{k_1 + k_2 + \ldots + k_m = r} \binom{r}{k_1, k_2, \ldots, k_m} \prod_{t=1}^m (p(x_t) l_t(x))^{k_t}$$

where $$\binom{r}{k_1, k_2, \ldots, k_m} = \frac{r!}{k_1! k_2! \ldots k_m!}$$

is the multinomial coefficient (Multinomial Theorem, n.d.). Accordingly, the $l_j(x)$ polynomials can be calculated by each participant independently. Next, each participant can calculate:

$$\langle L^r(x) \rangle_G = \left\langle \left( \sum_{j=1}^m p(x_j) l_j(x) \right)^r \right\rangle_G = \left\langle \sum_{k_1 + k_2 + \ldots + k_m = r} \binom{r}{k_1, k_2, \ldots, k_m} \prod_{t=1}^m (p(x_t) l_t(x))^{k_t} \right\rangle_G$$

such that $$\langle p^n(x_j) \rangle_G = \langle [p_1(x_j) + \ldots + p_k(x_j)]^n \rangle_G$$

which, in turn, can be rewritten as (using the multinomial expansion):

$$\langle p^n(x_j) \rangle_G = \langle [p_1(x_j) + \ldots + p_k(x_j)]^n \rangle_G =$$
$$\left\langle \sum_{k_1 + k_2 + \ldots + k_m = n} \binom{n}{k_1, k_2, \ldots, k_m} \prod_{t=1}^m p_t^{k_t}(x_j) \right\rangle_G$$

This means that participant i (who is the owner/creator of polynomial $p_i$) can provide participant j with powers of $\langle p_i(x_j) \rangle_G$, i.e., with the set:

$$\{\langle p_i^k(x_j) \rangle_G\}_{j \in \{1, \ldots, m\}}$$

This allows participant j to calculate $p_j^l(x_j) p_i^k(x_j) \cdot G$ (and similarly $p_j^l(x_i) p_i^k(x_i) \cdot G$) etc. In an embodiment, a participant calculates expressions on the form:

$$\langle L^r(x) \rangle_G = \left\langle \left( \sum_{j=1}^m p(x_j) l_j(x) \right)^r \right\rangle_G = \left\langle \sum_{k_1 + k_2 + \ldots + k_m = r} \binom{r}{k_1, k_2, \ldots, k_m} \prod_{t=1}^m (l_t(x))^{k_t} \right.$$
$$\left. \left( \sum_{k_1' + k_2' + \ldots + k_m' = k_t} \binom{k_t}{k_1', k_2', \ldots, k_m'} \prod_{t'=1}^m p_{t'}^{k_{t'}'}(x_j) \right) \right\rangle_G$$

Consider an example, in accordance with at least one embodiment, in which participants use an elliptic curve and where G is a generator in the corresponding (multiplicative) representation. In the case of two participants, A and B: A sends $\langle p_1(x_2) \rangle_G$ to B, and receives $\langle p_2(x_1) \rangle_G$ in return. Accordingly, participant A can calculate $$\langle p(x_1) \rangle_G = \langle p_1(x_1) + p_2(x_1) \rangle_G$$

and similarly, participant B can calculate:

$$\langle p(x_2) \rangle_G = \langle p_1(x_2) + p_2(x_2) \rangle_G$$

Using Lagrange interpolation it is possible to express p in terms of $p(x_1)$ and $p(x_2)$:

$$p(x) =$$
$$p(x_1) \frac{x - x_2}{x_1 - x_2} + p(x_2) \frac{x - x_1}{x_2 - x_1} = \frac{p(x_1) - p(x_2)}{x_1 - x_2} x + \frac{-p(x_1) x_2 + p(x_2) x_1}{x_1 - x_2}$$

Each participant can reconstruct $\langle p(x) \rangle_G$ (and in particular $\langle p(0) \rangle_G$), by means of the exchanged points $\langle p_i(x_j) \rangle_G$. For higher powers of $\langle p^n(x) \rangle_G$, the multinomial formula from the previous section may be utilised:

$$\langle p^n(x_j)\rangle_G = \langle [p_1(x_j)+\ldots+p_m(x_j)]^n\rangle_G =$$

$$\left\langle \sum_{k_1+k_2+\ldots+k_m=n} \binom{n}{k_1, k_2, \ldots, k_m} \prod_{t=1}^{m} p_t^{k_t}(x_j)\right\rangle_G$$

For m=2 this becomes:

$$\langle p^n(x_j)\rangle_G = \langle [p_1(x_j)+p_2(x_j)]^n\rangle_G = \left\langle \sum_{k_1+k_2=n} \binom{n}{k_1, k_2} \prod_{t=1}^{2} p_t^{k_t}(x_j)\right\rangle_G$$

After this exchange (following certain, pre-arranged conventions) both parties can calculate $\langle p^n(x_j)\rangle_G$ and, in particular, $\langle p^n(0)\rangle_G = \langle s^n\rangle_G$.

A protocol according to the process 600 is described hereinbelow. Since each participant needs to be able to obtain expressions of the form $$\langle p^n(x_j)\rangle_G = \langle [p_1(x_j)+p_2(x_j)]^n\rangle_G = \left\langle \sum_{k_1+k_2=n} \binom{n}{k_1, k_2} \prod_{t=1}^{2} p_t^{k_t}(x_j)\right\rangle_G$$

an ordering may necessary, when exchanging the points. Here we illustrate one such solution.

Without loss of generality, it can be assumed, in accordance with at least one embodiment, that participant 1 is the one submitting the first elliptic curve points. The protocol, in an embodiment, follows the steps:

1. Participant 1 distributes $\langle p_1^{k_1}(x_j)\rangle_G$ to all $i\neq 1$ participants, where $k_1=1, \ldots, n$ and $j=1, \ldots, m$, and where m here is the number of participants
2. Participant 2 distributes $\langle p_1^{k_1}(x_j)p_2^{k_2}(x_j)\rangle_G$ for $k_1=0, \ldots, n-1$, $k_2=1$, n and $j=1, \ldots, m$ to all $i\neq 2$ participants
3. Participant 3 distributes $\langle p_1^{k_1}(x_j)p_2^{k_2}(x_j)p_3^{k_3}(x_j)\rangle_G$ for $k_1=0, \ldots, n-1$, $k_2=0, \ldots, n-1$, $k_3=1, \ldots, n$ and $j=1, \ldots, m$ to all $i\neq 3$ participants
4. . . . (and so on, for each participant)

The lth participant in the sequence distributes $\langle p_1^{k_1}(x_j) \ldots p_k^{k_l}(x_j)\rangle_G$ for $k_i=0, \ldots, n-1$ for $i\in\{1, \ldots, l-1\}$, $k_l=1$, n and $j=1, \ldots, m$ to all $i\neq l$. When the last participant, m, distributes his/her points, all the participants have the necessary components to calculate $\langle s^n\rangle_G = \langle p^n(0)\rangle_G$.

In an embodiment, the process 600 comprises a plurality of m participants (e.g., more than 2 participants) that exchange sets of point of the form $\{\langle p_1^{k_1}(x_j) \ldots p_m^{k_m}(x_j)\rangle_G\}$ wherein the points are used by each participant to calculate $\langle p^k(x_j)\rangle_G$. The participants may then use the $\langle p^k(x_j)\rangle_G$, together with Lagrange interpolation, to obtain $\langle p^k(x)\rangle_G$ and, in particular, $\langle s^k\rangle_G = \langle p^k(0)\rangle_G$. In an embodiment, the points are elliptic curve points wherein $x_j\neq 0$ $\forall j$.

Figure 7:
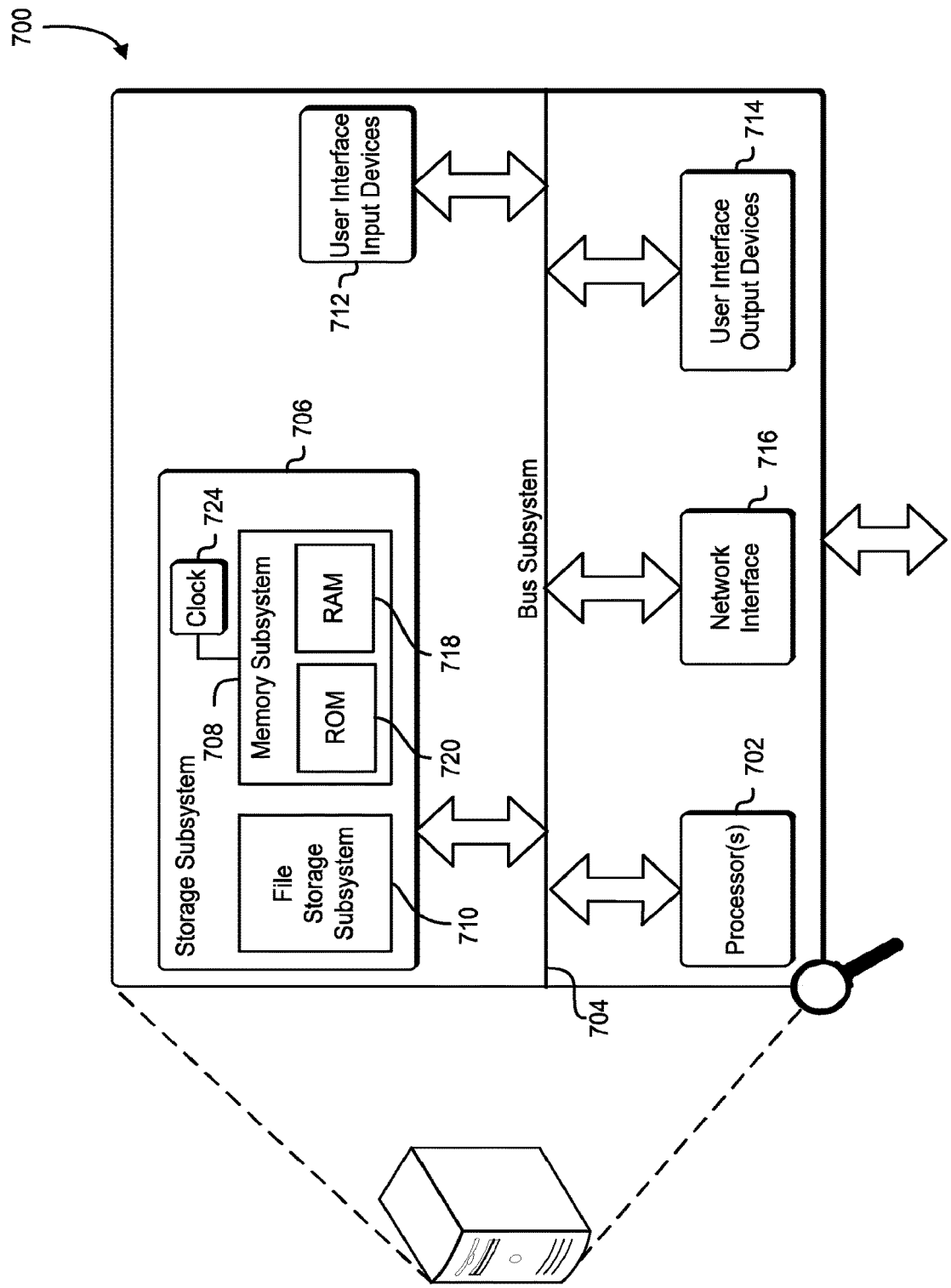
FIG. 7 illustrates a simplified block diagram of a computing device that can be used to practice at least one embodiment of the present disclosure.

FIG. 7 illustrates a simplified block diagram of a computing device that can be used in relation to one or more embodiments disclosed herein; This computing device, includes but is not limited to, one or more processors 702, a bus subsystem 704, a storage subsystem 706, a memory subsystem 708, a file storage subsystem 710, one or more user interface input devices 712, one or more user interface output devices 714, a network interface 716, a random access memory (RAM) 718, a read-only memory (ROM) 720, and a local clock 724.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. The mere fact that certain measures are recited in mutually different dependent claims does not indicate that a combination of these measures cannot be used to advantage.

The invention claimed is:

1. A computer-implemented method of executing a smart contract generated by a first computing entity and a second computing entity, the computer-implemented method implemented by a third computing entity different from both the first computing entity and the second computing entity, the computer-implemented method comprising:
   receiving, at the third computing entity, the smart contract comprising a first transaction input and an evaluation key Ek provided by the first computing entity and a second transaction input provided by the second computing entity;
   executing the smart contract by performing a computational task comprising the computation of a function on an input to the smart contract to produce an output of the smart contract;
   producing a proof of correct execution of the smart contract, wherein the proof is based at least in part on the evaluation key Ek;
   generating a blockchain transaction using the output of the smart contract; and
   validating, by a fourth computing entity different from the first, second, and third computing entities, the generated transaction using a verification key Vk and the proof.

2. The computer-implemented method according to claim 1, wherein the third computing entity is a node of a blockchain network.

3. The computer-implemented method according to claim 1, wherein the input comprises information that attests to an identity of the third computing entity.

4. The computer-implemented method according to claim 3, wherein the information comprises a digital signature generated by a private signature associated with the third computing entity.

5. The computer-implemented method according to claim 1, wherein the third computing entity receives a transfer of digital assets from at least one of the first computing entity or the second computing entity.

6. The computer-implemented method according to claim 1, wherein the input provided to the smart contract is provided by at least one of the first computing entity or the second computing entity.

7. The computer-implemented method according to claim 1, wherein producing the proof of correct execution comprises using an evaluation key.

8. The computer-implemented method according to claim 1, wherein executing the smart contract to produce the output comprises evaluating internal circuit wires of a quadratic arithmetic program to produce a quadratic arithmetic program output.

9. The computer-implemented method according to claim 8, wherein the quadratic arithmetic program is of size m and degree d.

10. The computer-implemented method according to claim 1, wherein the proof of correct execution of the smart contract is stored on a blockchain.

11. The computer-implemented method according to claim 1, wherein the smart contract comprises a Pay-To-Script-Hash type (P2SH-type) unlocking script that allows the third computing entity to unlock a first digital asset and a second digital asset in response to producing the proof of correct execution.

12. The computer-implemented method according to claim 11, wherein the P2SH-type unlocking script comprises at least one of: a verification key, an element of the verification key, or a hash of the verification key.

13. A system comprising:
   a first processor executing first computing entity;
   a second processor executing a second computing entity;
   a third processor executing a third computing entity different from both the first computing entity and the second computing entity;
   a smart contract generated by the first computing entity and the second computing entity; and
   memory including executable instructions of the third computing entity that, as a result of execution by the third processor, causes the system to:
      receive the smart contract comprising a first transaction input and an evaluation key Ek provided by the first computing entity and a second transaction input provided by the second computing entity;
      execute the smart contract by performing a computational task comprising the computation of a function on an input to the smart contract to produce an output of the smart contract;
      produce a proof of correct execution of the smart contract, wherein the proof is based at least in part on the evaluation key Ek;
      generate a blockchain transaction using the output of the smart contract; and
      validate, by a fourth computing entity different from the first, second, and third computing entities, the generated transaction using a verification key Vk and the proof.

14. A non-transitory computer-readable storage medium having stored thereon executable instructions that, as a result of being executed by a processor of a computer system, cause the computer system to:
   receive a smart contract comprising a first transaction input and an evaluation key Ek provided by a first computing entity external to the processor and a second transaction input provided by a second computing entity external to the processor, the processor executing a third computing entity different form the first computing entity and the second computing entity;

execute the smart contract by performing a computational task comprising a computation of a function on an input to the smart contract to produce an output of the smart contract;
produce a proof of correct execution of the smart contract;
generate a blockchain transaction using the output of the smart contract; and
validate, by a fourth computing entity different from the first, second, and third computing entities, the generated transaction using a verification key Vk and the proof.

* * * * *